(12) United States Patent  
NewDelman et al.

(10) Patent No.: US 12,202,024 B2  
(45) Date of Patent: Jan. 21, 2025

(54) APPARATUS FOR SUB-SURFACE INJECTION OF CONSTITUENTS

(71) Applicant: SUB-MERGENT TECHNOLOGIES, INC., Lake Oswego, OR (US)

(72) Inventors: Mitchell J. NewDelman, Monte Carlo (MC); John A. Sanders, Austin, TX (US)

(73) Assignee: SUB-MERGENT TECHNOLOGIES, INC., Southlake, TX (US)

(*) Notice: Subject to any disclaimer, the term of this patent is extended or adjusted under 35 U.S.C. 154(b) by 208 days.

(21) Appl. No.: 17/839,467

(22) Filed: Jun. 13, 2022

(65) Prior Publication Data
US 2023/0398588 A1 Dec. 14, 2023

(51) Int. Cl.
*E21B 10/44* (2006.01)
*B09C 1/08* (2006.01)
*E21B 7/02* (2006.01)

(52) U.S. Cl.
CPC ............... *B09C 1/08* (2013.01); *E21B 10/44* (2013.01); *B09C 2101/00* (2013.01); *E21B 7/027* (2013.01)

(58) Field of Classification Search
CPC ....... B09C 1/08; B09C 2101/00; E21B 10/44; E21B 7/027; A01C 23/026; A01B 79/005; A01B 49/065; A01B 45/023
See application file for complete search history.

(56) References Cited

FOREIGN PATENT DOCUMENTS

WO  WO-2020208383 A1 * 10/2020 ............. A01B 45/00

* cited by examiner

*Primary Examiner* — Carib A Oquendo
(74) *Attorney, Agent, or Firm* — Bailey Legal Services, PLLC

(57) ABSTRACT

Disclosed is an apparatus (100) for sub-surface injection of constituents of a slurry, wet mixture, and or gas in a phase of entrainment for controlled flow. The apparatus (100) includes a rotary union (113), a drilling assembly (403), hollow shaft injection drilling arrays (1003A), limit switches (1705, 1707, 1709), and encoders (1605B). The rotary union (113) facilitates the filling of the constituent in hollow shaft drilling bits (129) during a drilling process or before the drilling process via an opening and closing of a plurality of valves (111, 215, 505B, 805B, and 1107B). The constituents are capable of being injected through the rotary union, wherein the rotary union (113) is in concert with the valve (111) to dispense predefined quantities of constituents at a specific depth in a sequence of dispersal. The drilling assembly (403) is directed by a GPS (1413C) to control an X plane and Y-plane injection coordinates. The drilling assembly (403) determines through a PLC (1405C), a computer (1411C), and an AI robot (1505) in concert with achieved depths of the Z (cubic) volume of injected material. The hollow shaft injection drilling arrays (1003A) provide the sequential dispensing of the constituents at one or more targeted depths, wherein the hollow shaft injection drilling arrays (1003A) enable capturing of targeted volumes of constituents thereby creating mono or poly constituent horizons. The hollow shaft injection drilling arrays (1003A) are enabled by the limit switches (1705, 1707, 1709), the encoders (1605B), and the AI robot (1505) to sequence the constituents to be injected at specific depths.

33 Claims, 18 Drawing Sheets

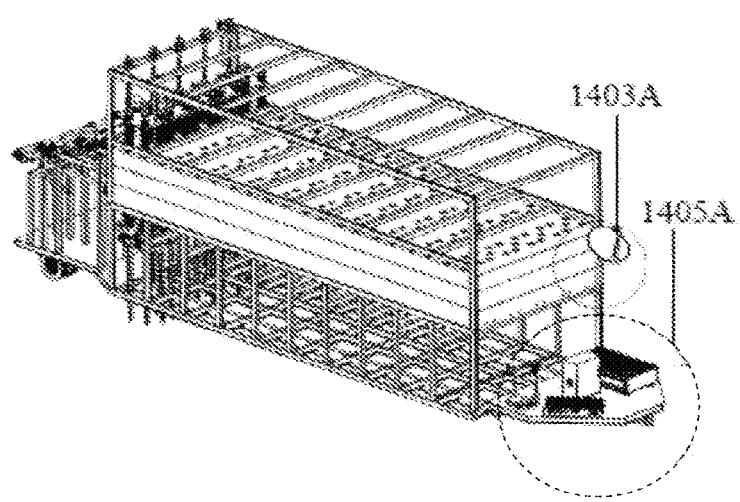 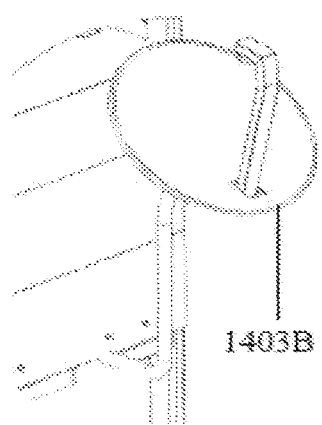
Figure 14A    Figure 14B
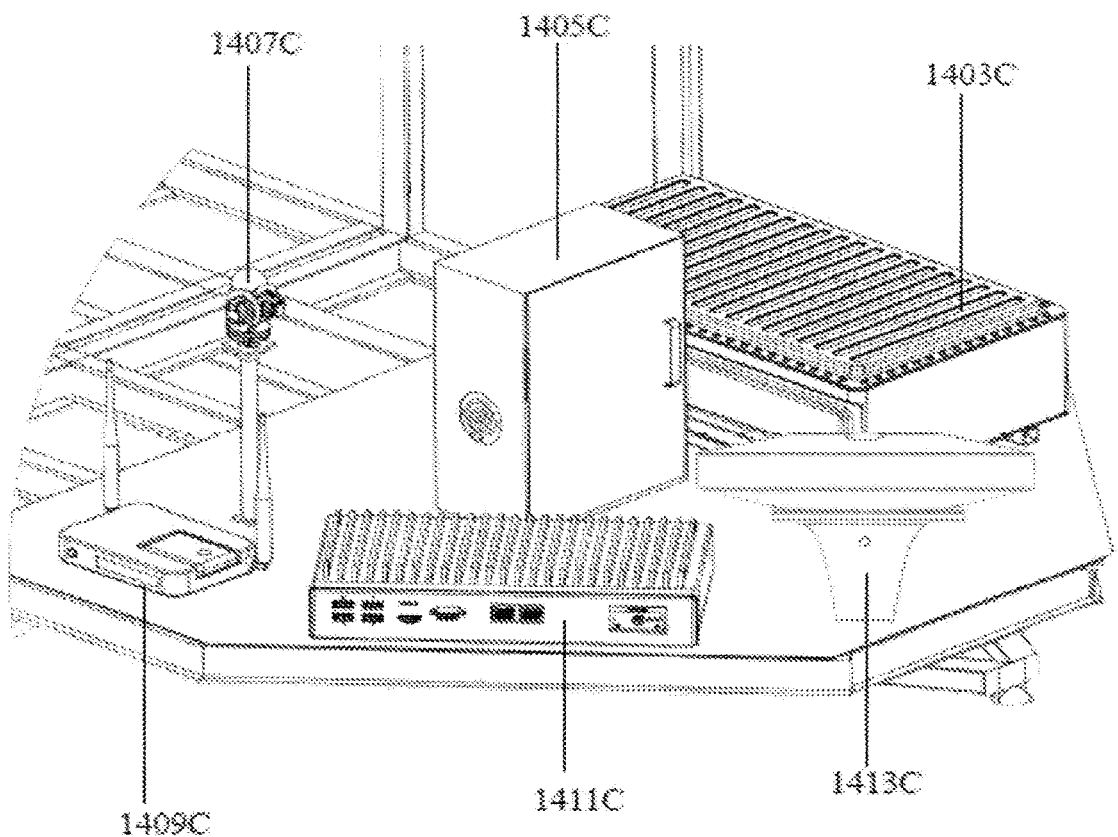
Figure 14C

APPARATUS FOR SUB-SURFACE INJECTION OF CONSTITUENTS

TECHNICAL FIELD

The present invention is generally related to an apparatus for sub-surface injection of constituents. More particularly, the present disclosure relates to an apparatus for sub-surface injection of constituents of a slurry, wet mixture, and or gas in a phase of entrainment for controlled flow, wherein the constituents are capable of being injected through a rotary union, manual, and or robotic quick connect-disconnect.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

De-carbonization is one of many key climate change initiatives. Annual biomass generation from forests, agriculture, and other organic streams is not being efficiently recycled in a manner to sequester the inherent carbon. Pyrolysis of organic matter generates biochar which contains quantifiable amounts of carbon capable of quasi-permanent sequestration if used as a soil amendment. Spreading or topsoil mulching of organic compost has a purpose and is useful, but composting has little carbon sequestration effect. Given the potential to certifiably sequester carbon into sub-optimal agricultural soils, the teaching contributes to urgently needed climate change solutions and is an economically practical measure that can be taken by a broad spectrum of productive landowners and public land managers.

Typically, biochar differs subject to its derived feedstock and pyrolysis formulae of heat, residency time, and other factors. However, biochar generally is a soil amendment material if applied in volume tolerances known to be beneficial such as five percent (5%) on a comparative cubic volume measurement of the amount of soil being amended. Currently, there are no prior arts that talk about biochar soil amendment tolerances. Biochar is useful in many ways, such as reducing irrigation demand for climate change periodic drought resilience, sorption/isolation of heavy metal contaminants, enhancing cationic exchange, rebalancing pH, and other soil chemistry levels, de-compaction of exhausted non-productive dirt et cetera.1 Sub-surface bio-char injection can be quantified for carbon accounting and hence also qualify as a certifiable quasi-permanent carbon sequestration method to attract public policy benefits. Likewise, it is known that other soil amendments can benefit depleted, exhausted or otherwise sub-optimal agricultural soils, by way of example but not limitation compost, NPK2, 3, and mycorrhizal fungi4.

Further, biochar makes a greater contribution to global decarbonization when buried below the soil surface, especially at the more targeted root zone depths. Other organic materials by way of example but not limitation compost, soil friendly bacteriological additives, and similar humus-generating mixtures, nutrients, predator fungi, and mycorrhizal fungi/mycorrhizal spores can also help improve sub-optimal soil and likewise may provide greater benefits to soils if buried at the desired root zone depth.

Today, known methods of burying any soil amendment material underground, including trenching, are time-consuming and hence expensive. A rudimentary hole in the ground by hand or by mechanical shovel, awl, ditch witch trencher, or an auger, that is then partially filled with soil amendment materials might logically provide dosages at each location per cavity volume and at optimal depths but at an uneconomic cost of labor. Mechanical injectors are known but no current mechanized solution exists for targeted dosing at targeted depths or at or above water table depth.

European patent application EP1203522A1 filed by Hargreaves Jonathan William et al. discloses Ground injection, e.g., aeration, apparatus adapted to be mounted on or drawn by a tractor and comprising one or more tines reciprocated vertically by a crank and crankshaft-driven from a motor. Each tine defines an internal passage with outlet apertures. A piston rod connected to each tine and a cylinder have a piston that forces air into a reservoir and via a line into the passage. The mechanism is timed such that a pulse of air is injected into the ground through outlet apertures at the position of maximum penetration of the ground by each tine. Instead of air, a liquid or other gaseous substance may be injected into the ground where it is penetrated by each tine. The apparatus may include two or more rows of such tines and associated injection means.

A PCT application WO 2020/020890 A1 filed by Reid Brian J et al. discloses a solid dosage form comprising biochar and at least one pesticide and/or at least one antimicrobial, wherein said biochar and said at least one pesticide and/or said at least one antimicrobial is homogeneously mixed in said dosage form and said dosage form does not have a layered structure. The invention also provides a method for preparing the dosage form, a liquid composition comprising the dosage form, and a method of controlling pests using the dosage form.

However, none of these prior arts talk about targeted injection(s) at or below the horizon A and or below 30 cm from the surface.

This specification recognizes that there is a need for an efficient apparatus to economically regenerate sub-optimal agricultural lands that can inject targeted colloids and the slurry of fluidized and/or aerosolized soil amendments at optimal subsurface level depths. Further, there is a need for an apparatus to facilitate the targeted injection of any slurry, biochar slurry, and other organic or non-organic materials in a four-dimensional manner: X-axis and Y-axis coordinate at the surface and Z depth axis for each parcel of land being amended.

Thus, in view of the above, there is a long-felt need in the industry to address the aforementioned deficiencies and inadequacies.

Further limitations and disadvantages of conventional and traditional approaches will become apparent to one having skill in the art through comparison of described systems with some aspects of the present disclosure, as set forth in the remainder of the present application and with reference to the drawings.

SUMMARY OF THE INVENTION

An apparatus for sub-surface injection of constituents of a slurry, wet mixture, and or gas in a phase of entrainment for controlled flow is provided substantially, as shown in and/or described in connection with at least one of the figures, as set forth more completely in the claims.

An aspect of the present disclosure relates to an apparatus for sub-surface injection of a plurality of constituents of a slurry, wet mixture, and or gas in a phase of entrainment for controlled flow. The apparatus includes a rotary union, a drilling assembly, a plurality of hollow shaft injection drilling arrays, a plurality of limit switches, and a plurality of encoders. The rotary union facilitates the filling of the constituent in one or more hollow shaft drilling bits during a drilling process or before the drilling process via an opening and closing of a plurality of valves. The plurality of constituents comprising slurry, solution, cold steam or hot steam, suspension, colloid, and a damp substance or a dry substance capable of being injected through the rotary union, wherein the rotary union is in concert with the valve to dispense predefined quantities of constituents at a specific depth in a sequence of dispersal. The drilling assembly may be directed by a global positioning satellite (GPS) to control an X plane and Y-plane injection coordinates. The drilling assembly determines through a PLC, a computer, and an AI robot in concert with achieved depths of the Z (cubic) volume of injected material. The hollow shaft injection drilling arrays provide the sequential dispensing of the constituents at one or more targeted depths, wherein the hollow shaft injection drilling arrays enable capturing of targeted volumes of constituents thereby creating mono or poly constituent horizons. The hollow shaft injection drilling arrays are enabled by the plurality of limit switches, the plurality of encoders, and the AI robot to sequence the constituents to be injected at specific depths.

In an aspect, the rotary union enables one or more multiphase pumps and a conduit piping of the one or more multiphase pumps to fill the hollow shaft injection drill bit.

In an aspect, the rotary union disperses the phase changed colloids or gas under pressure through the hollow shaft of the injection drill bit.

In an aspect, the rotary union comprises an input conduit or a flex pipe to disperse in the sequence with varied times of a programmable logic controller (PLC), a computer, or the AI robot-controlled prescription for an amendment.

In an aspect, the rotary union rotation can be turned on or off based on filling sequence or ejection prescription volume.

In an aspect, the rotary union can be fed with the input conduit or a flex pipe.

In an aspect, the rotary union can be fed by the input conduit or the flex pipe that are connected via a female quick-connect, and a male quick disconnect.

In an aspect, the rotary union turns in conjunction with a PTO a gearbox or a lead screw, a pump, and a gearbox assembly.

In an aspect, the hollow shaft injection drilling arrays enable one or more hollow shaft of drill bits to be refilled with the constituents at specific depths to achieve volume efficacy.

In an aspect, the hollow shaft injection drilling arrays enable subsurface injection of living organisms, other micro-organisms, bacteria, fungi, gases, liquid, damp, slurry, steam, wettable, and or dry constituents through the one or more hollow shaft injection drill bits.

In an aspect, the hollow shaft injection drilling arrays enable time interval injection of the constituent to determine the volume to change soil porosity, wherein the encoders calculate the time based on the revolutions and depth achievement of the encoders.

In an aspect, the hollow shaft injection drilling arrays inject horizontally or vertically during the descending drilling process.

In an aspect, the hollow shaft injection drilling arrays inject horizontally or vertically during the ascending drilling process.

In an aspect, the hollow shaft injection drilling arrays act independently or in concert during the ascending drilling process.

In an aspect, the hollow shaft injection drilling arrays act independently or in concert during the descending drilling process.

In an aspect, the hollow shaft injection drilling arrays enable a single injection drill bit or a plurality of injection drill bits to act independently.

In an aspect, the hollow shaft injection drilling arrays enable independent member hollow shaft drill bits to individually stop drilling, or to stop at an interval of time.

In an aspect, the hollow shaft injection drilling arrays enable independent member hollow shaft drill bits to individually stop drilling, or to stop at a specific depth.

In an aspect, the hollow shaft injection drilling arrays enable independent hollow shaft drill bits to individually stop drilling upon Lidar mapping detection of specified impediments.

In an aspect, the hollow shaft injection drilling arrays enable independent hollow shaft drill bits to individually stop drilling upon slowed revolutions encoder detection indicates specified resistance.

In an aspect, the hollow shaft injection drilling arrays are enabled via the AI (artificial intelligence) robot, the PLC, the computer, a database, the GPS, lidar, and or other subsurface map overlay to prescribe subsurface actions.

In an aspect, the hollow shaft injection drilling arrays enable via the encoder data act as an inference for the AI robot, the PLC, the computer, and the database of soil type porosity and tightness dynamically interpreting revolution speed resistance to the hollow shaft injection drill bit.

In an aspect, the hollow shaft injection drilling arrays enable strata by strata data from core samples with the GPS coordinates to enable proper RPM range for hollow shaft injection drill bit motors, or PTO to protect from damage.

In an aspect, the hollow shaft injection drilling arrays enable the database of soil type to dynamically interact with shaft injection drill bit variable speed PTO and or motors to protect from damage.

In an aspect, the hollow shaft injection drilling arrays enable the dynamic sample recording of information to the PLC and the computer local or cloud of specific injection depths at the GPS location including date stamp.

In an aspect, the hollow shaft injection drilling arrays enable dynamic recording of information to the PLC and the computer local or cloud of specific depth and volume dispensed of specific Constituent at the GPS location including date stamp.

In an aspect, the hollow shaft injection drilling arrays enable subsurface instrument and or sensor introduction and recordation through the hollow shaft of the drill bit and its apertures and or perforations to take specific readings.

In an aspect, the hollow shaft injection drilling arrays enable arrays and/or individual member hollow shaft drill bits within the array to independently be controlled by the AI robot, the PLC, and the computer for maximum or minimum depth based on constituent prescription.

In an aspect, the hollow shaft injection drilling arrays enable any exterior surface of a hollow shaft drill bit to be a carrier of constituents for sub-surface kinetic release.

In an aspect, the hollow shaft injection drilling arrays enable any exterior surface of a hollow shaft drill bit to be coated with adhesives and then with abrasives to mitigate smearing.

In an aspect, the hollow shaft injection drilling arrays enable any perforation(s) cavity of a hollow shaft drill bit to be coated with adhesives and then with abrasives to mitigate smearing.

In an aspect, the hollow shaft injection drilling arrays enable any perforation(s) cavity of a hollow shaft drill bit to be filled with a Constituent to be ejected at specific depths.

In an aspect, the hollow shaft injection drilling arrays have tips that are interchangeable in some designs with a plethora of drill bits tips based on ternary soil type or proximity to GPS plotted populated horticulture perennials.

In an aspect, the AI robot comprises an AI robot lens to assess the depth of the platform above ground to determine the targeted descent or ascent of any part of an auger assembly and how far it has traveled for the filling of and subsequent ejection of the hollow shaft of the injection drill bit contents.

Accordingly, one advantage of the present invention is that it provides a potentially major advance in regenerative agriculture by providing an apparatus that can actualize the circular economic cycle of any constituent including but not limited to constituents by way of example but not limited to biomass and/or mycorrhizal fungi to sequestered pyrolysis biochar to revitalize sub-optimal, exhausted, or depleted farmland soils and/or provide climate change resiliency to soils for recurring droughts.

Year on year data will validate the significant economic utility of this invention by way of example but not limited to increased yields, fruit size, plant size, climate change drought resiliency, and certifiable tons of CO2e being sequestered.

The business utility of regenerative soil amendment, bringing sub-optimal agricultural land back to life is consistent with global and national climate change policy. At the local level, there are many regions of the USA and other concerned nations that have dead or sub-optimal land that can become more productive at a comparable lower overall carbon cost because of biochar sequestration through deep sub-surface injection.

This teaching should be viewed as a sub-optimal land re-vitalization solution consistent with global environmental policy and related infrastructure initiatives including both privately owned land as well as land held in trust for laudable climate change conservation objectives by federal trustees, State trustees, non-governmental agricultural farmland trustees and other trustees of local non-profit land conservation land holding trusts.

Accordingly, one advantage of the present invention is that it has a broad array of applications from hand-held garden type devices to large parcel mechanized apparatus arrays behind or in front of agricultural or construction-related power units and or implements for revitalizing contaminated legacy industrial sites through de-contamination site preparation for the development of built structures to provide surrounding healthy green belt soils and landscaping, and in the non-built emerging industry of regenerative agriculture/silviculture.

These features and advantages of the present disclosure may be appreciated by reviewing the following description of the present disclosure, along with the accompanying figures wherein like reference numerals refer to like parts.

BRIEF DESCRIPTION OF DRAWINGS

The accompanying drawings illustrate the embodiments of systems, methods, and other aspects of the disclosure. Any person with ordinary skills in the art will appreciate that the illustrated element boundaries (e.g., boxes, groups of boxes, or other shapes) in the figures represent an example of the boundaries. In some examples, one element may be designed as multiple elements, or multiple elements may be designed as one element. In some examples, an element shown as an internal component of one element may be implemented as an external component in another and vice versa. Furthermore, the elements may not be drawn to scale.

Various embodiments will hereinafter be described in accordance with the appended drawings, which are provided to illustrate, not limit, the scope, wherein similar designations denote similar elements, and in which:

FIG. 14A illustrates a view of an exemplary communications platform of an injection drilling trailer with components seen in FIG. 14B and FIG. 14C, in accordance with at least one embodiment.

FIG. 14B illustrates a view of an exemplary satellite communications dish, in accordance with at least one embodiment.

FIG. 14C illustrates a view of an exemplary close-up of components within a circle of FIGS. 14A and 1405A, in accordance with at least one embodiment.

FIG. 18 B illustrates an exemplary view of a close-up of FIG. 18A, in accordance with at least one embodiment.

DETAILED DESCRIPTION

Figure 1:
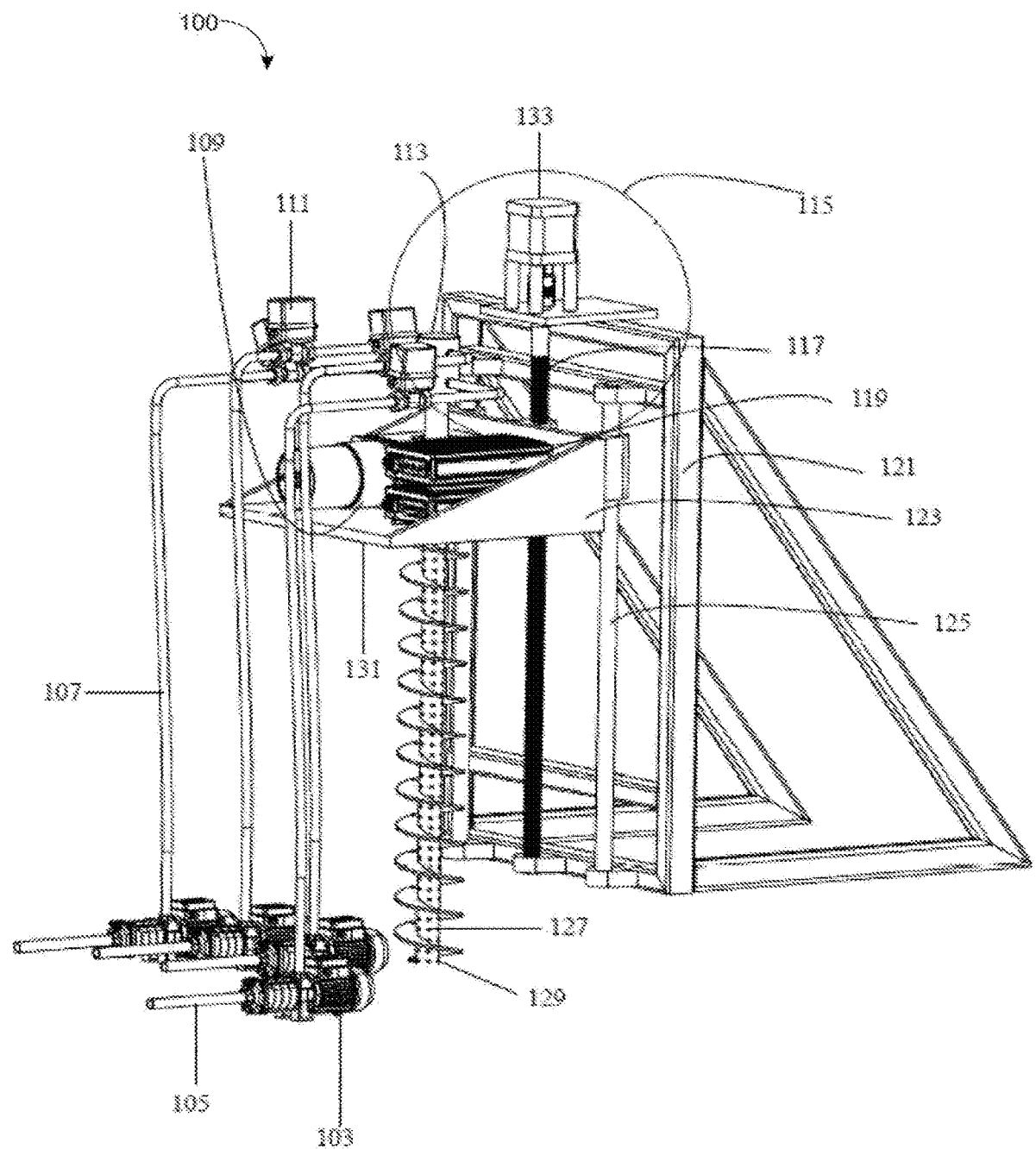
FIG. 1 illustrates an exemplary side view of a single injection drilling unit with multiple multiphase pumps, valves, rotary union, the platform with guides, and motorized power screw, in accordance with at least one embodiment.

The present disclosure is best understood with reference to the detailed figures and description set forth herein.

Various embodiments have been discussed with reference to the figures. However, those skilled in the art will readily appreciate that the detailed descriptions provided herein with respect to the figures are merely for explanatory purposes, as the methods and systems may extend beyond the described embodiments. For instance, the teachings presented and the needs of a particular application may yield multiple alternative and suitable approaches to implement the functionality of any detail described herein. Therefore, any approach may extend beyond certain implementation choices in the following embodiments.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Methods of the present invention may be implemented by performing or completing manually, automatically, or a combination thereof, selected steps or tasks. The term "method" refers to manners, means, techniques, and procedures for accomplishing a given task including, but not limited to, those manners, means, techniques, and procedures either known to, or readily developed from known manners, means, techniques and procedures by practitioners of the art to which the invention belongs. The descriptions, examples, methods, and materials presented in the claims and the specification are not to be construed as limiting but rather as illustrative only. Those skilled in the art will envision many other possible variations within the scope of the technology described herein.

The invention disclosed and taught herein is directed to the emerging new generation of targeted regenerative farming technology where specific sub-optimal soils can be amended by specific dosing at optimal root zone depths of amendment materials, including but not by way of limitation, volumes of biochar slurry alone or in combination with designated volumes of other injectable constituents by targeted programmable pressurized release through the taught excavating and dispersal apparatus into a series of surface entry holes at programmed locations and at programmable sub-surface depths.

The invention is an injection mechanism (apparatus or device) with an interchangeable hollow shaft drill bit and or associated perforated tubes that enables programmable sequenced volumes of material to be injected and dispersed at specifically programmed subsurface depths.

Although the primary objective is soil amendment injection into soils, the teaching could be exploited if used at an angle to inject fluidized material by way of example but not limited to cement or bioproducts by way of example but not limited to nano bioplastics that cure or cross-link into a material having structural hardness under an existing structure.

The future of farming requires monitoring soil health and amending sub-optimal soils in a targeted manner. Our teaching provides for controlled dosage of soil amendments by specific surface location, specific optimal depths, specific dosages, and specific sequencing and/or order of injection of the respective volumes of one type or multiple types of injectable materials.

The invention teaches an apparatus having variable perforation profiles on both internal and external sleeves that are removable and interchangeable.

According to a first embodiment of the present invention, it enables the emerging new generation of targeted regenerative farming technology where specific sub-optimal soils can be amended by specific dosing at optimal root zone depths of amendment materials, including but not by way of limitation, volumes of biochar slurry alone or in combination with designated volumes of other injectable constituents by targeted programmable pressurized release through the taught excavating and dispersal apparatus into a series of surface entry holes at programmed locations and at programmable sub-surface depths.

According to a second embodiment of the present invention, it enables fumigation by colloid injections.

According to a third embodiment of the present apparatus includes variable perforation profiles on both internal and external sleeves that are removable and interchangeable.

According to a fourth embodiment of the present invention, it enables controlled dosage of soil amendments by specific sub surface location, specific optimal depths, specific dosages, and specific sequencing and/or order of injection of the respective volumes of one type or multiple types of injectable materials as the future of farming requires monitoring soil health and amending sub-optimal soils in a targeted manner.

According to a fifth embodiment of the present invention, it enables exploitation if used at an angle to inject fluidized material by way of example but not limited to cement or bioproducts such as nano bioplastics that cure or cross-link into a material having structural hardness under an existing structure.

According to a sixth embodiment of the present invention, it enables an injection mechanism (apparatus or device) with an interchangeable hollow shaft drill bit and associated perforated tubes that enables AI Robotically, Computer, PLC, and or Sensor sequenced volumes of material to be injected and dispersed at specifically programmed subsurface depths.

According to a seventh embodiment of the present invention, it enables to inject of targeted slurry, suspension, and/or colloid soil amendments at optimal subsurface level depths.

According to an eighth embodiment of the present invention, it enables to change of the bulk mass density of sub-surface soils by injection of materials with a different density.

According to the ninth embodiment of the present invention, it enables inject gas that cools soil and roots inhibiting the growth and or spread of diseases including but not limited to fungus.

According to a tenth embodiment of the present invention, it enables the lateral destruction of root systems by methods including the high-pressure water jet or lower pressure lateral treatment of prescriptive amendments for root system health.

According to an eleventh embodiment of the present invention, it is enabled by the injection of binders into a formulated berm structure the bottom of which is below the surface.

According to a twelfth embodiment of the present invention, it enables the transplantation of living biologicals by way of example but is not limited to eggs, larva, and or pupae sub-surface.

According to a thirteenth embodiment of the present invention, it enables minimal surface disruption by sealing the surface aperture with a colloid or other compatible sealant.

According to a fourteenth embodiment of the present invention, it enables a structural berm by ejection of tubes filled with appropriate amendment creating bollards above ground with sub-surface structure.

According to a fifteenth embodiment of the present invention, it enables an X, Y, and Z plane-based structure adding strength by way of cylindrical hypocycloid reinforcement between injections.

According to a sixteenth embodiment of the present invention, it enables soil amendment by leeching or biological burrowing into the target soil in the adjacent hypocycloid segments between injection sites.

According to a seventeenth embodiment of the present invention, it enables the injection of abrasives in sequence or within constituents to avoid smearing, According to an eighteenth embodiment of the present invention, it enables coating with viscous and or surfactant materials laterally through perforations.

According to a nineteenth embodiment of the present invention, it enables sub-surface fire management with appropriate suppressants.

According to a twentieth embodiment of the present invention, it enables fertilization via the sub-surface of immediate and or time-released constituents.

According to a twenty-first embodiment of the present invention, it enables the placement of sub-surface perforated water holding chambers either empty or filled with aggregate.

According to a twenty-second embodiment of the present invention, it enables changes in the bulk mass density of soil at specific depths.

According to a twenty-third embodiment of the present invention, it enables an increase of porosity by prescriptive aggregate injections.

According to a twenty-fourth embodiment of the present invention, it enables biological activity by the creation of eco-friendly horizon injection of organic matter, sand, clays, and or aggregates into the soil in the known ternary diagram.

According to a twenty-fifth embodiment, sub-surface treatment using the present invention as an injection mechanism (apparatus or device) with a hollow shaft interchangeable drill bit and associated perforated tubes that enables programmable sequenced volumes of material to be injected and dispersed at specifically programmed subsurface depths.

A twenty-sixth embodiment is a variable pressure of slurry injections dependent on ternary soil composition.

A twenty-seventh embodiment is to increase the global inventory of arable land with appropriate porosity constituents prescriptive for its ternary type. Porosity modification is a function of the shape and size of solid constituents such as but not by way of limitation, aggregates affecting the bulk mass density of the targeted horizon. Likewise living constituents such as but not by way of limitation, aneic earthworms can improve porosity by penetrating below horizon A.

Definitions

"Abrasives": means any Constituent capable of inhibiting smearing. By way of example but not limited to abrasives that include walnut shells, pecan shells, and corn stover.

"Actuated": A device that causes a machine or other device to operate open or close and dispense a volume of material by way of example but not limited to a gate or valve opening or closing.

"Agitation": the action of briskly stirring or disturbing something, especially a liquid: "the techniques mostly involve agitation by stirring"

"AI Robot" Artificial intelligence (AI), the ability of a digital computer or computer-controlled robot to perform tasks, such as but not limited to determining sub-surface resistance, observational thermal changes from the injection, etc. in communication with sensors commonly associated with intelligent beings.

"Aerosol Column": A column associated with viscous material that gasifies constituent material, along with earthen plates, to mitigate any electric frictional charges. Columns may be made from materials by way of example but are not limitation polyamide or graphene composite.

"Aperture": An inlet or outlet orifice or opening in a vessel that is located at the top or the bottom of a Drill Bit or TBI.

"Amendment Material": when used herein means any substance known to render a productivity advantage or benefit to sub-optimal soils and/or which provides any remediation benefit to such soils; and includes any biochar, compost, bacterial humus, and soil nutrients, fertilizers and fungi, particularly mycorrhizal fungi and mycorrhizal spores.

"Antimicrobial": is an agent that kills micro-organisms or stops their growth. Antimicrobials can be grouped according to the microorganisms they act primarily against. For example, antibiotics are used against bacteria, and antifungals are used against fungi.

"Ball Screw": A high-efficiency feed screw with the ball making a rolling motion between the screw axis and the nut. Compared with a conventional sliding screw, this product has drive torque of one-third or less, making it most suitable for saving drive motor power.

"Baits": Any agent that attracts a pest or an unwanted organism. By way of example and not meant to be limiting, Baits for insects are often food-based baits and are an effective and selective method of insect control. Typically, a bait consists of a base material called a carrier (often grain or animal protein) plus a toxicant (most often insecticides such as organophosphates, carbamates, or pyrethroids) and sometimes an additive (usually oil, sugar, or water) to increase attractiveness. The toxicant part of bait can also be biological rather than chemical. Examples of biological toxicants are *Bacillus thuringiensis* (Bt), parasitic nematodes, and fungi. Many baits are not highly attractive to the insect but instead function as an arrestant. Baits for rodents are generally cereal-based and made of grains such as oats, wheat, barley, corn, or a combination thereof. Formulations may also contain other ingredients such as adherents to bond the toxicant to the grain particles.

"Calibrate": To ascertain that the output of a device properly corresponds to the information it is measuring, receiving, or transmitting. This might involve the location of scale graduations, adjustment to bring the output within the specified tolerance, or ascertaining the error by comparing the output to a reference standard. To divide or mark with gradations, graduations, or other indexes of degree, quantity, specific gravity, density, as on a thermometer, measuring cup, or any specific volume.

"Calibration": The process of adjusting an instrument or compiling a deviation chart so that its reading can be correlated to the actual values or sequential values, being measured.

"Cavitation": Although taught as a separate daughter invention, we claim the use of one or more ultrasound devices such as a Helmoltz155 box for fixing onto the exterior of any vessel or pipe holding or transporting soil amendment slurry as generally described in the description of the invention.

"Chemical": Means a compound or substance that has been purified or prepared, especially artificially for purposes of sub-surface amendments, such as but not limited to: fertilizers, sorption materials like zeolites, fungicides, herbicides, and insecticides. A chemical can mean any basic substance which is used in or produced by a reaction involving changes to atoms or molecules by way of example but is not limited to any liquid, solid, or gas.

"Colloids": are uniform mixtures that don't separate or settle out. While colloidal mixtures are generally considered to be homogeneous mixtures, they often display heterogeneous quality when viewed on the microscopic scale. There are two parts to every colloid mixture: the particles and the dispersing medium. The colloid particles are solids or liquids that are suspended in the medium. These particles are larger than molecules, distinguishing a colloid from a solution. However, the particles in a colloid are smaller than those found in a suspension. In smoke, for example, solid particles from combustion are suspended in a gas. Colloids include, examples of colloids include by way of example but are not limited to the following fog, smoke, and foam.

"Constituents": Any soil amendment material by way of example but not limitation abrasives, aggregate, amendments, minerals, lime, calcium, calcium carbonate, abrasives, antimicrobials, baits, bio-char, biologicals, bio-mass, carbon including activated, chemicals, colloids, compost, eco colonies, pre cursors to the eco colony, living organisms, inoculants, gas or any other material that can be injected sub surface to change the soil composition and or temperature. Constituents can mean chemical pesticides or natural biologicals for unwanted pests. Solid Constituents can be any polygonal shape, such as fines, granules, pellets, briquettes, blocks, or larger fragments that can fit inside and be ejected from a hollow shaft drill bit. Colloids regardless of phase state are considered as constituents. Constituents can contain doses of other constituents. Constituents also include Sorption or Sorbents materials.

"Coupling, Gear Box Couplings, Gear Box Disc Coupling": Transmit torque from a driving to a driven bolt or shaft tangentially on a common bolt circle. Gear Box couplings are designed to transmit torque between two shafts that are not collinear. They typically consist of two flexible joints—one fixed to each shaft—which are connected by a spindle, or third shaft. A flange within the drawings below or at the top of a gearbox is Disc Couplings.

"Damping": This can refer to the equipment platform, where the substrate is materials such as granite or plastics that have tensile strength for mounting but have properties to damp vibration and or torque.

"Density": Bulk density, also called apparent density or volumetric density, is a property of powders, granules, and other "divided" solids, especially used in reference to mineral components (soil, gravel), chemical substances, "Digital Sensor": any electronic or electrochemical sensor that captures data, where data conversion and data transmission are done digitally. Through software, these sensors may become a component or components to separate or fractionate a slurry stream.

"Drill Bit" Any device capable of making a subsurface hole when connected to a power source with perforation holes or apertures, which may be any polygon with equal or unequal side lengths, and is manufactured from alloys, steel, titanium, manganese, or other materials. The drill bit may contain industrial diamonds for sub-surface injection cavity creation.

"Earthen Plates": An electrode, in the form of a metal plate buried in external soil, used to earth the electrical system of a building or machine to mollify electrical charges.

"Eco Colony": Any subsurface space that is created by the injection of preferred constituents as established or precursor natural habitat for any specific desirable living organism.

"Eco Colony Pre Cursors": Injected subsurface Eco Colony habitat that is not populated by inhabitant colony.

"Encoders": Encoders are used in machinery for motion feedback and motion control. Encoders are found in machinery in all industries. Encoders (or binary encoders) are the combinational circuits that are used to change the applied input signal into a coded format at the output. These digital circuits come under the category of a medium-scale integrated circuits. In the present case, they assist in-depth assessment and or achievement. Encoders through communication with PLC, Computer, or AI robotics and other interactive devices can trigger drilling platform ascent or descent or deployment and or retraction stacking of plunger. Depth achievement can trigger dispensing, plunger instructions, reamer wings, continued drilling or ascent, and then descent or repetition of these actions.

"Excretion": the process of eliminating or expelling material from the Drill Bit or TBI.

"Flange": Is a rim. Where a flange appears in a drawing associated with a hollow shaft injection drill bit can also mean a Gear Box Coupling and or Gear Box Disc Coupling. A flange can also be a chord and part of the internal diameter of the Tube.

"Flex Pipe": Flexible water supply tubes made from materials such as braided nylon comes with a reinforced braided outer core and often have a solid PVC inner core.

"Gear Box": The gearbox is a mechanical device used to increase the output torque or to change the speed (RPM) of a motor. The shaft of the motor is connected to one end of the gearbox and through the internal configuration of gears of a gearbox, provides a given output torque and speed determined by the gear ratio.

"GPS": Global Positioning System: a global system of U.S. navigational satellites developed to provide targeted positional and velocity data and global time synchronization to determine the position of an injection site "Injection": Insertion of any Constituents sub surface and or sub terra.

"Injection Drill Bit": Any hollow shaft device of any polygonal width or diameter that is capable of penetration of ice, soil, rock, and or mineral.

"Inoculants": A constituent (a virus or toxin or immune serum) that is introduced into the subsurface of soil to produce or increase immunity to an undesirable living organism.

"Lead Screw": A threaded rod that drives the platform tool carriage in a drill or drilling array when subsurface drilling. Lead Screw can also be a Ball Screw, Worm Screw or Worm Gear.

"Limit Switch": a switch preventing the travel of an object in a mechanism past some predetermined point, mechanically operated by the motion of the object itself. Limit Switches are found in machinery in all industries. In this application assist in communicating depth achievement for ascent or descent communicating to PLC, Computer, or AI robotics and other interactive devices. Depth achievement can trigger dispensing, plunger instructions, reamer wings, continued drilling or ascent, and then descent or repetition of these actions. A limit switch can refer to a plurality.

"Living Organisms": An individual form of life, such as a bacterium, protist, fungus, plant, or animal, is composed of a single cell or a complex of cells in which organelles or organs work together to carry out the various processes of life, including in some circumstances virus.

"Magnetic Metals": Include ferromagnetic metals such as iron, nickel, cobalt, gadolinium, dysprosium, and alloys such as steel that also contain specific ferromagnetic metals such as iron or nickel.

"Minerals": A solid chemical compound with fairly well-defined chemical composition and a specific crystal structure that occurs naturally in pure form.

"Multiphase Pump (DODA® pump)": a pump that can handle the complete production from a mud, slurry, water, and sand, for example) without needing to separate or process the production stream. DODA® is a brand for pumping highly fibrous sludge and slurry. The high-speed open design impeller combined with the two static and one rotating chopper blade handles the most challenging solids.

"Organic Matter": Organic matter, organic material, or natural organic matter refers to the large source of carbon-based compounds found within natural and engineered, terrestrial, and aquatic environments. It is matter composed of organic compounds that have come from the feces and remains of organisms such as plants and animals. In soils, dead matter makes up roughly 85% of the organic matter. Organic matter includes dead matter, living microbes, and living parts of plants (e.g., roots). Organic Matter includes the four basic types pure substance that cannot be broken down into other types of substances; lipid organic compound such as fat or oil; matter anything that takes up space and has mass; monosaccharide simple sugar such as glucose that is a building block of carbohydrates; nucleic acid organic compound such as DNA or RNA; nucleotide.

"Perforations" are holes or a break, which may be any polygon with equal or unequal side lengths and or any number of sides, whose sides could be linear, concave, convex, or any Platonic solids: such as a tetrahedron (4-sided pyramid), cube, octahedron, dodecahedron, and the icosahedron. Any Perforation shape can be tiled or tessellated or in a combination of shapes that can be tiled or tessellated in one or more dimensional planes. Any combination of Perforation polygonal shapes that can produce a pattern or random pattern. When Perforated sheets are stacked their hole tessellated, tiled, or repeating patterns may be offset to one another, thus creating a smaller and unique 4-dimensional hole. These Perforation holes may be any polygon with equal or unequal side lengths. Perforation holes could include shapes that will not perfectly tessellate but leave a small gap, such as an irregularly shaped pentagon. Perforations can also mean permeable materials such as woven textiles, aramids, metal textiles, expanded metal, and perforated pulled extruded forms.

"PLC": A programmable logic controller (PLC) is a small, modular solid-state computer with customized instructions for performing a particular task. PLCs, which are used in industrial control systems (ICS) for a wide variety of industries, have largely replaced mechanical relays, drum sequencers, and cam timers. PLCs are used for repeatable processes and have no mechanical parts and they can gather information from sensors. PLC can also mean a computer, and or remote Cloud computer.

"Planes": In mathematics, a plane is a flat, two-dimensional surface that extends infinitely far. A plane is the two-dimensional analogue of a point (zero dimensions), a line (one dimension), and three-dimensional space. Planes can arise as subspaces of some higher-dimensional space, as with one of a room's walls, infinitely extended, or they may enjoy an independent existence in their own right, as in the setting of Euclidean geometry.

"Planes X": The cartesian plane is a graph with one x-axis and one y-axis (that's why it's sometimes called an X Y graph). These two axes are perpendicular to each other.

"Planes Y": The cartesian plane is a graph with one x-axis and one y-axis (that's why it's sometimes called an X Y graph). These two axes are perpendicular to each other.

"Planes Z": In mathematics, the complex plane or z-plane is a geometric representation of the complex numbers established by the real axis and the perpendicular imaginary axis.

"Planes W": when used herein means the fourth dimension; volume or dosing of slurries such as biochar and/or the respective volume of each of the other soil amendment materials being injected in any form of slurry or aerosol. W is the volume variable of the cavity hole excavated to the desired depth where the cubic dimensional size indicates the total volume of soil amendment material being injected.

"Platform": A ledge or shelf with damping.

"Polygon": a plane figure with at least three straight sides and angles, and typically five or more.

"Porosity Soil or Soil Porosity": refers to the quantity of pores, or open space, between soil particles. Pore spaces may be formed due to the movement of roots, worms, and insects; expanding gases trapped within these spaces by groundwater, and/or the dissolution of the soil's parent material. Soil texture can also affect soil porosity. There are three main soil textures: sand, silt, and clay. Sand particles have diameters between 0.05 and 2.0 mm (visible to the naked eye) and are gritty to the touch. Silt is smooth and slippery to the touch when wet, and individual particles are between 0.002 and 0.05 mm in size. Clay is less than 0.002 mm in size and is sticky when wet. The differences in the size and shape of sand, silt, and clay influence the way the soil particles fit together, and thus their porosity.

"PTO": Power take-off (PTO) is a device that transfers an engine's mechanical power to another piece of equipment. A PTO allows the hosting energy source to transmit power to additional equipment that does not have its engine or motor. For example, a PTO helps to run a gear box using a tractor engine.

"Programmable Logic Controller" (PLC): Computer-based industrial monitoring and control package with applications mostly in the areas of safety, sequential or logical operations, where control actions are based on equipment and alarm status.

"Proportional Control": A control mode, which generates an output correction in proportion to error (the process variable's deviation from the set-point).

"Proportional-Integral-Derivative" (PID): Also referred to as a 3-mode controller, combining proportional, integral, and derivative control actions.

"Reynolds Numbers": The Reynolds number is the ratio of inertial forces to viscous forces within a fluid that is subjected to relative internal movement due to different fluid velocities. A region where these forces change behavior is known as a boundary layer, such as the bounding surface in the interior of a pipe.

"Root Zone": as used herein refers to different optimal depths depending upon the flora species to be planted or for existing flora suffering from sub-optimal soil conditions on the parcel of land to be amended.

"Rotary Union": A rotary union is a device that enables the transfer of media from a stationary source to a rotating source without cross-contamination or leakage. A rotary union allows for the movement of a fluid media (oil, coolant, water, etc.) from a stationary device (a sink, an oil tank, a vat, etc.) to a moving device (an engine, propeller, turbine, etc.).

"Sensing Element": The element that is directly responsive to the value of a measured variable.

"Sensitivity": The minimum change in a physical variable to which an instrument can respond; the ratio of the change in output magnitude to the change of the input which causes it after the steady-state has been reached.

"Sensor": An element or device that detects a variable by receiving information in the form of one quantity and converting it to information in the form of that or another quantity.

"Segregation" means controlled isolation of separated molecules and/or sequencing of such segregation.

"Slurry": a semi-liquid or fluidized mixture, with or without mycorrhizal fungi and/or mycorrhizal spores, biochar, minerals, chemicals, compost, manures, humus generating bacteria, sludges, including compatible carrier forms such as gels, or foams, typically of fine particles suspended in water.

"Sorption or Sorbents" Materials capable of adsorbing/absorbing one or more constituents in gas, fluid, liquid, or a mixture thereof. Examples include activated carbon, atomic particles, bio-char, carbon materials, activated carbon, carbon nanotubes, catalysis, graphene, metal hydrides, nanoparticles, nano-structured materials, polymeric organic frameworks, silica, silica gel, clay, zeolites, other adsorbents/absorbents, or combination thereof. Useful adsorbents/absorbents, such as carbon materials, have high surface areas and a high density of pores with optimal diameter. Sorption or Sorbents can be different types of activated charcoal and zeolites. Sorption or Sorbents may also be combinations that vary by type(s) of metal ions and/or organic material(s) used, and may be made in molecular clusters or molecular chains to obtain the desired quality, i.e. type of adsorption/absorption, and volume capacity in terms of the desired porosity. Examples of Sorption or Sorbents also include constituents such as but are not limited to Bio-Char and Zeolites.

"Strata" or "Strata Positioning" means the placing of Tube Modules into known density and/or volume stratum within a Drill Bit intended to treat soil with constituents at specific depths.

"Subsoil": is the layer of soil below the topsoil. The layer of soil closest to our feet is topsoil. Geologists refer to it as the "A" horizon, whereas subsoil is the "B" horizon. Topsoil is much more fertile than subsoil because it contains more organic matter, thus giving it a darker color. As per the soil profile, this is a kind of soil that lies below the surface soil but above the bedrocks. It is also called undersoil or B Horizon soil. It lies between C Horizon and E Horizon. The B Horizon predominantly consists of leached materials as well as minerals such as iron and aluminum compounds. Living Organisms aid Horizon A fertility but these organisms because of Porosity spend very little time below Horizon A.

"Suspended": Suspended is defined as suspension which is a heterogeneous mixture in which the solute particles do not dissolve but get suspended throughout the bulk of the medium. Emulsions are a type of suspension, where two immiscible liquids are mixed together. Any constituents that are liquid or particle held in suspension.

"Suspensions": An emulsion is a suspension of two liquids that usually do not mix together. These liquids that do not mix are said to be immiscible. An example would be oil and water.

"Transporting pipes rigid or flex pipe": See Flex Pipe "Vessel" Any entirely hard-walled in situ or compression device; similar atmospheric pressure device; or any non-porous, soft bag-like or balloon-like container or tank with at least one hard feature being an orifice that can be repeatedly opened and closed; which can also be oriented in any physical position but which has any number or purposes of inlets or outlets and is capable of being opened and closed repeatedly to load and retrieve slurry and or constituents or any section of any pipe, fixed or flexed or conduit made of any material with or without compression that is closed to the outside atmosphere at both ends; or having at least one end thereof connectable to another pipe, conduit or inlet/outlet connection of any further pipe, conduit or device; that could hold injection slurry or constituents.

"Tube": Tube in Bit Insert "TBI" may be a pressurized sealed "Internal" or in situ Vessel, with at least one orifice that could be an inlet and outlet orifice and or connections to a rotary union with valve. The "internal" TBI is housed within another "external" Drill Bit. The Internal Vessel will house any slurry or constituents. The external Drill Bit may or may have vertical or horizontal perforations and or apertures. It may or may not hold slurry, and it may or may not contain specific soil amendment constituents or liquids.

"TBI" includes protection of internal TBI vessel, supplemental protection of accidental leaks from the internal vessel, permits multiple types of containment materials, TBI: if heated allows for thermal transfer or insulation, and is made of plastics, such as polyamide or polyamide composites, epoxy, metals; corrosion-resistant aluminum, steel, alloys, ferrous and non-ferrous, et cetera and it is a removable device consisting of one or several fixed or flexible pipes or pipe coils or further internal vessel within an external Drill Bit. Perforation shapes and sizes are limited only by the structural integrity of the material used to fabricate the TBI.

"TBI-Hose": means primary and/or secondary feeder hoses containing amendment materials or slurry can have an incorporated impeller or ultrasonic device to push, plunge, or pull slurry and amendment flows.

"TBI-Rotary Union" means multiple pipes or hoses each containing differing slurry or amendment constituents, can be connected in parallel or series to specifically segregate identified molecular constituents for subsequent sub soil treatment since each TBI in such a 'train' can be closed off; opened, unloaded with unsaturated specific targeted materials for multi-sub plane or topical GPS injection or ejection sites, and then reloaded with fresh material.

"Ultrasonic related to cavitation": Ultrasonic level sensors are used for non-contact level sensing of highly viscous liquids, as well as bulk solids. They are also widely used in water treatment applications for pump control and open channel flow measurement. The sensors emit high frequency (20 kHz to 200 kHz) acoustic waves that are reflected to and detected by the emitting transducer.

"Worm Screw and Worm Gear": Used to transmit motion and power when a high-ratio speed reduction is required. Worm Screws and Worm Gears accommodate a wide range of speed ratios.

Valves: "Ball Valves:" A ball valve is a quarter-turn rotational motion valve that used a ball-shaped disk to control a flow. If the valve is opened, the holes in the ball stay in line with the body inlet allowing contents to pass. Ball Valves are made of carbon steel, stainless steel, alloys, and other materials.

"Valve Needle" A needle valve is a type of valve with a small port and a threaded, needle-shaped plunger. It allows targeted regulation of flow, although it is generally only capable of relatively low flow rates. Actuated needle valve when used herein means a known device for dispensing atomizing or aerosolizing substances through pressure enabling the substance to flow through a narrow exit point.

"Valve Actuated" Valve Actuators can automate valves so that no human interaction with the valve package is necessary to cycle the valve. They can be remotely operated and act as shutdown mechanisms in an emergency that would be dangerous for human intervention. At a basic level, an actuator is a control mechanism that is operated by an energy source.

"Variable": Any condition that is measured, controlled (directly or indirectly), or manipulated.

"Vector": A quantity having both magnitude and direction.

"Velocity": A vector where magnitude is the speed.

"Viscosity": the state of being thick, sticky, and semifluid in consistency, due to internal friction; cooling the fluid raises its viscosity.

"Zeolites": Any of various hydrous silicates that are analogous in composition to the feldspars, occur as secondary minerals in cavities of lavas, and can act as ion-exchangers. Any of various natural or synthesized silicates of similar structure are used especially in water softening and as adsorbents and catalysts. Zeolites offer the capability of salinity and boron remediation. Clinoptilolite (a naturally occurring zeolite) is used as a soil treatment in agriculture. It is a source of potassium that is released slowly. They can adsorb effluent and ammonia, and subsequently be used as soil nutrients.

As mentioned above at Utility, climate change distressed drought-prone agricultural land, exhausted agricultural land, and contaminated land with developmental potential can be amended and/or remediated by the in-situ introduction of specified engineered and/or specified enhanced bio-char adjunction by way of fluidized injection and sub-surface penetration.

Although a further utility and purpose, the injection of engineered bio-char at targeted depths can also remediate heavy metal contaminated parcels of land that will reduce seepage potential into the water table or nearby water ways and reduces Phyto uptake of contaminants into the food chain.

For waterway protection of storm waters, a sub-surface biochar wall is similar to a berm but at depths and with minimal surface disruption while creating a sub-surface bio-char berm wall.

One preferred embodiment of the present invention is an apparatus for sub-surface injection and pressurized dispersion of a slurry, of several known soil amendment materials alone with an engineered bio-char vector into the sub-surface at a set depth environment. Added constituents further strengthen soil health treatment efficacy by way of example but do not limit mycorrhizal fungi, NPK, and the general hydrophilic property of aged bio-char for moisture retention.

The benefits achievable are soil remediation, reduced irrigation demand for crops and/or isolation of heavy metal contaminants reducing phytological plant root uptake into an animal or human food chains, and/or reduced soil matrix compaction of exhausted land by encouraging mycorrhizal regeneration in stable aggregate support for tilth, cultivation, plant growth and conservation against continuing environmental insults causing further degradation of productive soil.

Generally known is the use of clay to establish coherent structures in dry conditions. Clay has been used to combat desertification and to increase the fertility of the soil. Clay has a twofold function when applied to the soil. It enhances water retention, reduces the wash-out of fertilizers, and rehabilitates the soil's ion exchange.

Biochar has some properties like clay and the application of biochar onto agricultural land at the surface is not as effective as mechanically placing biochar at a designated subsurface root zone depth. Bio-char sub-surface injection should have enhanced positive benefits, especially when injected with other soil amendment materials.

The object of the invention is to propose biochar ground down to small-caliber sizes that are smaller than the variable perforation dimensions in the taught device/apparatus, while maintaining biochar's natural internal structure for porosity, alone or in combination with clay and/or in combination with other constituents of any size such as fertilizing nutrients and especially soluble mycorrhizal fungi and/or mycorrhizal spores, all of which are capable of being injected into the soil down to root zone at optimal depths as a water borne slurry according to our teaching.

The purpose of this invention, therefore, teaches a process, a method, and/or an apparatus or device to apply constituents and by way of example and not limited to bio-char-vector soil amendment and biochar vector remediation to sub-optimal or exhausted and/or drought-stressed agricultural land with less mechanical work and more efficient placement in contact with a desired root zone level at reduced costs.

One embodiment of the invention substantially relates to a use of known chemical and physical properties of each different bio-char from a wide variety of appropriate biomass, such as processed nutshell residue, field crop residue, animal litter or algae-derived bio-char as compared to woody biomass derived bio-char and so on for all other organic biomass feedstocks.

Depending upon the remediation and/or amendment and/or draught resistance/irrigation reduction needs of the target soil, specialized Constituents by way of example but not limitation bio-char prepared to the necessary size can be transported to the parcel for sub-surface injection to the target root zone.

The purpose of a smaller handheld embodiment is the utility of drilling one hole at a time and releasing soil amendment materials including by way of example but not limited to biochar and mycorrhizal fungi and/or mycorrhizal spores at optimal root zone depths in smaller parks and gardens.

The object is achieved by the features disclosed below in the specifications.

Depending upon the soil chemistry and recommended amendments to regenerate depleted, exhausted, or compacted sub-optimal agricultural soils, the teaching consists of using biochar ground to small diameter sizes from fines to diameters physically capable of passing through any sized perforations. Biochar slurry, either alone or in combination with other materials such as compost, NPK nutrients, slow-release fertilizer and/or activated carbon, biodegradable encapsulated inert gases, zeolites and/or other sorbents, and/or mycorrhizal fungi elements and/or spores are mechanically, or pressure agitated to maintain fluidity and/or ultrasound cavitated to be aerosolized. The only limit as to the size and number of perforations is the structural integrity or hardness of the materials employed.

The constituents are then injected through the apparatus with or without a further nozzle or actuated needle valve to generate a pressurized stream of mycorrhizal fungi and/or its spores into the subsurface at one or more pre-determined desired root zone level depths.

In a further embodiment of the invention, depending on the complexity of the soil analysis determinative of an optimal amendment program, multiple simultaneous injections can be made at any one opened augured cavity or more than one in the entire array of the taught augers; each taught auger capable of being controlled to disperse the programmed volume of each amendment material for each specific hole and each at the same or variable programmed depths.

Injections can be controlled by depth placement of the internal tube closing or opening external apertures of the drill bit. The tube can be filled with or programmed to inject, multiple layers of slurries or constituents.

Dispersal of amendments in the cavity can be controlled by time intervals combined with the calculation of soil resistance and slurry density creating the flow rate and corresponding required injection pressure.

As an example, and not a limitation, injections can be sequenced so that mycorrhizal fungi are dispensed first, then bio-char slurry, and or sand, then compost, and finally a water rinse of the device.

Artificial Intelligence (AI) programming of sub-surface sensors of impediments encountered can map and pause, continue, or withdraw the drilling apparatus. Further, by programmed observation of time intervals and depths achieved, the auger drilling into the cavity can be paused, continued, or withdrawn. Programmer can choose to dispense according to depth rule settings or pause any one or more auger drills for any one or of the next injection site(s).

Variable diameter drill bits can be interchangeable with motors, gear boxes, and rotary unions.

Depending upon advances in mobile battery storage devices and/or less heavy mobile fuel cell electricity generation capable of adequate amperage, the gear boxes may be eliminated and substituted with variable speed electric motors thereby adding to zero-emission farming.

The teaching includes the possible use of multiple streams of injected slurries by way of example but is not limited to one for water to rinse the perforations, one for the constituents like mycorrhizal fungi, one for the bio-char alone or in association with other organic materials by way of example but not limitation compost which could become government policy by rulemaking authority.

The present invention teaches the use of a perforated hollow-core auger drill-bit. One embodiment of this perforated hollow-core auger drill-bit allows for material volume release under pressure programmed by variables of time and total aperture size of engaged perforations.

Further, the invention uses an interchangeable tube that further enhances the ability to undertake targeted injection of each injected material. The device may further exploit a known rotary union, which is a device that enables the transfer of media such as slurry or additive constituents from a stationary source to a rotating source without cross-contamination or leakage.

During the vertical or slanted vertical drilling on relatively flat land or sloping land, and/or once the desired drill depth is reached, the fluidized slurry and/or aerosolized elements are then injected under pressure through the drill bit perforated hollow core. This is another teaching of the invention.

Hollow-core augers made with a heat-treated steel alloy are known for shallow depth top-down or bottom-up injection. However, we teach non-linear sub-surface injection that can be shallow, and at or below the root level.

The slurry can employ any agriculturally appropriate liquid as a carrier, often from an approximate local water source.

One advantage of the pressurized injection is the broader measurable volumetric dispersal of the slurry no matter the composition, introduced at the desired subsurface level, such as at the known root zone for the intended agricultural use or as a subsurface bio-char barrier or berm wall.

One embodiment of the drill bit can be manufactured as a cavity-creating (bore hole) device operated by a gear box made by an industrial manufacturer skilled in the art of gearboxes. Gearbox manufacturers use known techniques to integrate a Programmable Logic Controller (PLC), Computers, and/or Artificial Intelligence (AI) Robotic tools to facilitate operational criteria by way of example but not limitation 1) optimal slurry dispersal at one or more desired depths, 2) detection of sub-surface obstructions such as rocks or an underground drain pipe or drain tile for automatic retraction and displacement to next hole location and 3) recording geo-coordinates of all completed slurry release holes, all obstructed partially completed/aborted holes and/or all non-completed holes.

Although a gearbox conceived for undulating agricultural land and/or programmed for use by an interconnected AI Robotically, Computer, PLC, and or Sensor may be new, no claim is made for the gearbox. Therefore, no detailed drawing of the gearbox is provided. However, specific AI Robotically, Computer, PLC and or Sensor programs, PLC robotic programs, and/or Artificial Intelligence Robots with their associated sensors and algorithmic programs and/or other intellectual property such as software developed for use in association with the teachings herein are reserved for daughter patents and/or trade secret disclosure and or software copyright protection.

As a practical matter, a technique known as a Power Take-Off Unit (PTO) or any new Three-point hitch must be compatible with the destined tractor's hydraulic system or with the destined external pump. This is a known engineering task to be done by or for the manufacturer of the gearbox to allow attachment to one or more known models of motorized common farm equipment such as tractors, or for any motorized equipment where the taught apparatus is pushed rather than pulled.

It is recognized that the number of acres of land under cultivation by most farmers and/or the sub-optimal acres owned by a land developer may not justify the purchase of the apparatus taught in this provisional patent. However, rental of specialized implements or engaging specialized agricultural service providers is known.

Although agriculture science knows of the advantages of soil amendments, the costs without automation of root zone inoculation are prohibitive. Our teaching makes subsurface soil amendment economic to the point that the productive value-added to the sub-optimal agricultural land will normally outweigh the cost of subsurface soil amendment using our invention.

Likewise, large parcel land remediation, whether required for construction permitting or not, can be significantly less costly through the exploitation of the taught injection invention than through topsoil removal and replacement.

The actuated needle valve is a method for dosing the slurry with materials by way of example but is not limited to one form of mycorrhizal fungi or another. The teaching includes the ability to disperse a programmed dose of a material at a specific depth for a specific volume, interval, using soil tension signals, and by time in conjunction with pressure.

When aerosolized through a viscosity column (shown as a potential daughter patent), the actuated needle valve could accomplish the same task.

If for any reason the optimal form of mycorrhizal fungi is incompatible with controlled admixture into the slurry, such mycorrhizal fungi material in the proper dosage per surface measured acre might be best injected in an auxiliary manner before, after, or concomitantly with the slurry. The liquid needle valve and or viscosity aerosols column and actuated needle valve are compatible methods to inject controlled volumes of mycorrhizal fungi and/or mycorrhizal spores if not first physically mixed with the slurry being injected into a broader or narrower range of root zone depths in the same hole.

Any slurry containing solids may settle out of the solution and become an obstruction when drawn from any reservoir or pipe before the point of injection. To avoid sedimentation, the slurry can be agitated by any known mechanical, or pressure means that periodically or constantly agitates the slurry to maintain a homogeneous flow of its constituents.

It should be understood from the foregoing description that various modifications and changes may be made in the preferred embodiments of the invention without departing from its true spirit and might be further developed in daughter patents. The foregoing description is for illustration only and should not be construed in a limiting sense.

The forgoing describes the professional use of the invention primarily for farmland and large contaminated parcel amendment. However, the same invention in a smaller form of a hollow screw rather than an interchangeable tube drill bit for hand held use without a rotary union for drilling and insertion one hole at a time is also taught. Within this embodiment with known external water hose connections to the internal perforated tube for release of slurries and/or other soil amendment materials including mycorrhizal fungi and fluidized bio-char through the external perforated screw drill. The utility of a screw device that releases soil amendment materials at designated depths as the screw penetrates the soil at any angle is that when unscrewing the device from the hole, most of the soil remains in place rather than at the surface surrounding the top of the hole.

Figure 10A:
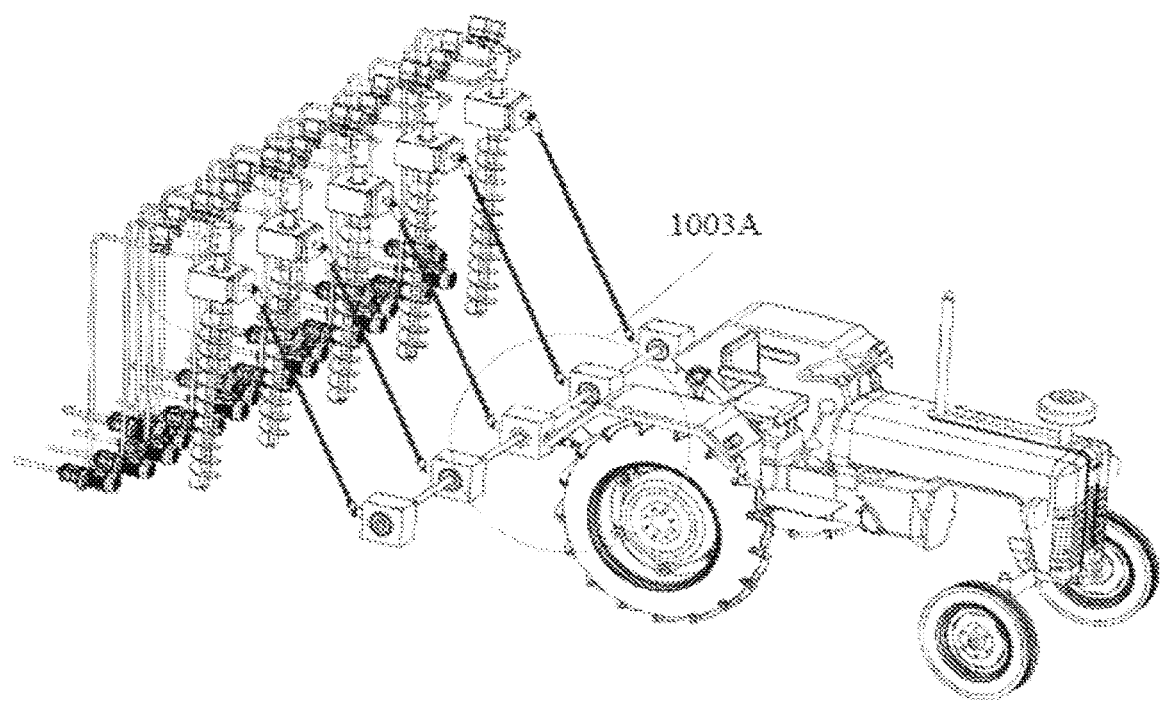
FIG. 10A illustrates a view of an exemplary PTO-driven array of injection drill bits and associated valves, pumps, and pipes with gearbox close-up call out 11A, in accordance with at least one embodiment.

FIG. 1 illustrates an exemplary side view of a single injection drilling unit with multiple multiphase pumps, valves, rotary union, the platform with guides, and motorized power screw, in accordance with at least one embodiment. FIG. 1 depicts an apparatus (100) for sub-surface injection of a plurality of constituents of a slurry, wet mixture, and or gas in a phase of entrainment for controlled flow. FIG. 1 depicts DODA® or multiphase pump (103), input conduit or flex pipe (105), conduit (107), motor (109), valve (111), rotary union (113), call out for close up of FIG. 2 (115), platform motion lead screw (117), fuel cell (119), rail support structure (121), platform (123), platform guide (125), injection drilling perforation (127), hollow shaft injection drilling bit (129), fuel cell (131), and platform motor (133). The apparatus (100) includes a rotary union (113), a drilling assembly (403), a plurality of hollow shaft injection drilling arrays (1003A)(shown in FIG. 10A), and a plurality of limit switches (1705, 1707, 1709) (shown in FIG. 17), and a plurality of encoders (1605B)(shown in FIG. 16B). In an embodiment, the apparatus (100) is shown in FIG. 1 and FIG. 10A. The apparatus (100) shown in FIG. 1 is powered by a motor and gearbox, while the apparatus of the FIG. 10A is powered by a tractor's PTO and gearboxes.

The rotary union (113) facilitates the filling of the constituent in one or more hollow shaft drilling bits (129) during a drilling process or before the drilling process via an opening and closing of a plurality of valves (111, 215, 505B, 805B, and 1107B). The plurality of constituents comprising slurry, solution, cold steam or hot steam, suspension, colloid, and a damp substance or a dry substance capable of being injected through the rotary union, wherein the rotary union (113) is in concert with the valve (111) to dispense pre-defined quantities of constituents at a specific depth in a sequence of dispersal. According to an embodiment herein, the specific depth is in a range between 4 inches to 72 inches. Thus, the soil and land parcel are dependent on where the user injects the apparatus.

In an embodiment, the rotary union (113) enables one or more multiphase pumps (103) and a conduit piping (105) of the one or more multiphase pumps (103) to fill the hollow shaft injection drill bit (129). In an embodiment, the rotary union (113) disperses the phase changed colloids or gas under pressure through the hollow shaft of the injection drill bit (129). In an embodiment, the rotary union (113) rotation can be turned on or off based on filling sequence or ejection prescription volume. In an embodiment, the rotary union (113) can be fed with the input conduit or a flex pipe (105).

Figure 2:
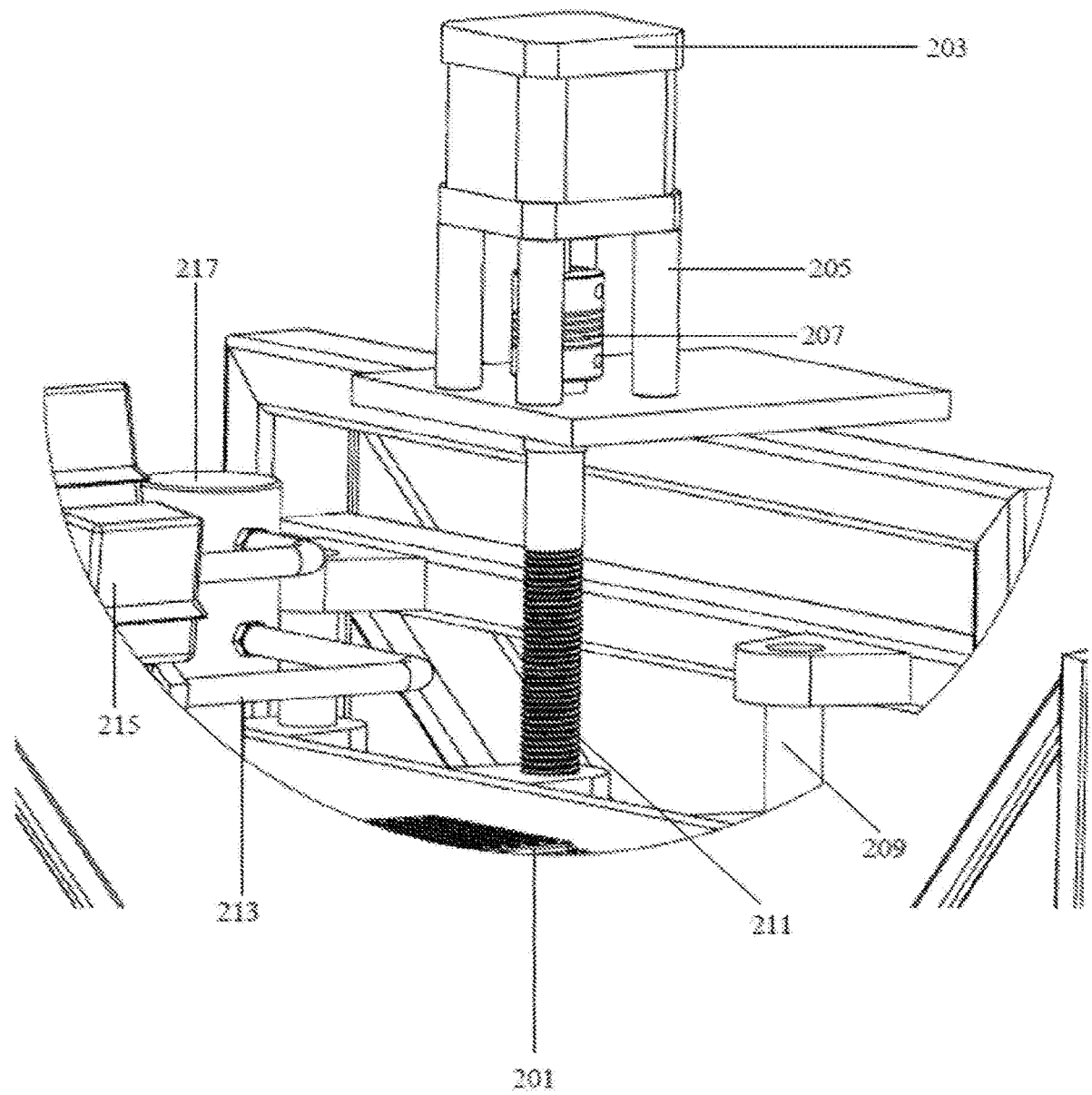
FIG. 2 illustrates a view of an exemplary close-up of FIG. 1 and call out of 115 which shows a single injection drilling unit with multiple multiphase pumps, valves, rotary union, a platform with guides, and motorized power screw, in accordance with at least one embodiment.

FIG. 2 illustrates a view of an exemplary close-up of FIG. 1 and call out of 115 which shows a single injection drilling unit with multiple multiphase pumps, valves, rotary union, a platform with guides, and motorized power screw, in accordance with at least one embodiment. FIG. 2 is explained in conjunction with FIG. 1. FIG. 2 depicts motor (203), motor support 205, motor platform motion screw shaft interface 207 platform guide 209, platform motion lead screw shaft 211, conduit 213, valve 215, and rotary union 217. In an embodiment, the rotary union (113) turns in conjunction with a PTO a gearbox (509B) or a lead screw (211), a pump (109), and a gearbox assembly (503A).

Figure 3:
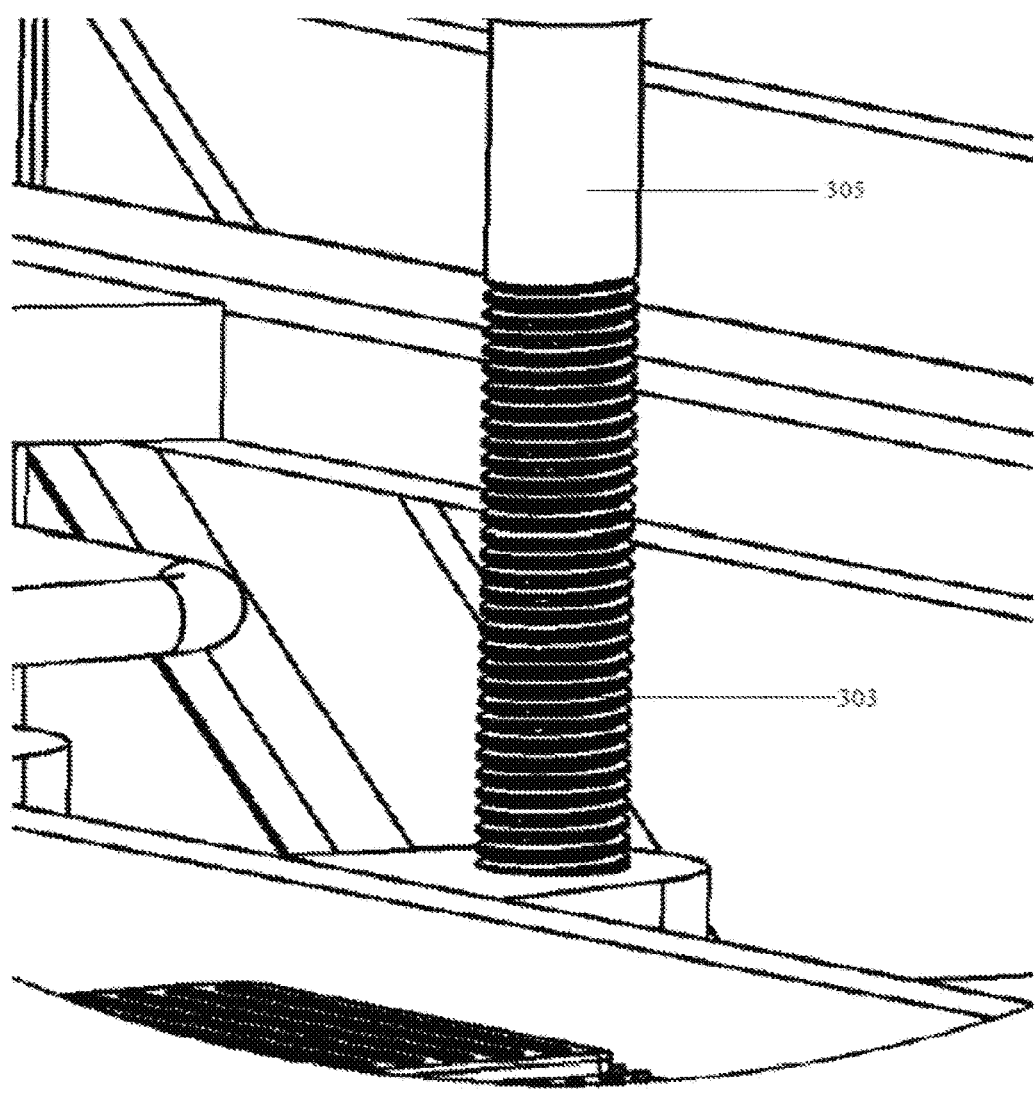
FIG. 3 illustrates a view of an exemplary close-up of a lead screw, in accordance with at least one embodiment.

FIG. 3 illustrates a view of an exemplary close-up of a lead screw, in accordance with at least one embodiment. FIG. 3 is explained in conjunction with FIG. 1. FIG. 3 depicts platform lead motion screw shaft interface 303, and platform lead motion shaft interface 305.

Figure 4:
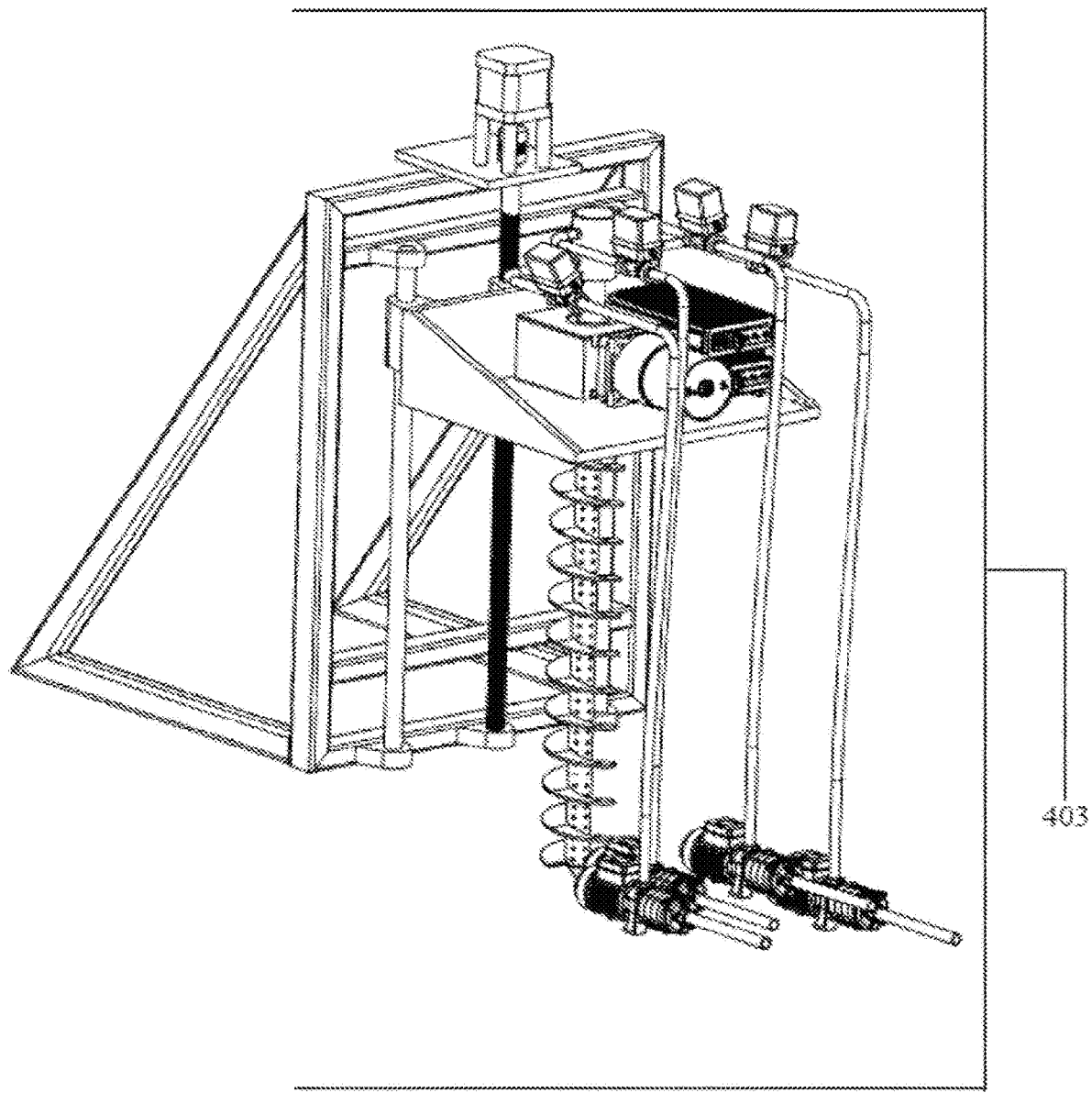
FIG. 4 illustrates an exemplary front view of a single injection drilling unit with multiple multiphase pumps, valves, rotary union, the platform with guides, and motorized platform power screw, in accordance with at least one embodiment.

FIG. 4 illustrates an exemplary front view of a single injection drilling unit with multiple multiphase pumps, valves, rotary union, the platform with guides, and motorized platform power screw, in accordance with at least one embodiment. FIG. 4 is explained in conjunction with FIG. 1. FIG. 4 depicts the left side view of FIG. 1 assembly 403. The drilling assembly (403) is directed by a global positioning satellite (GPS) (1413C) to control an X plane and Y-plane injection coordinates. The drilling assembly (403) determines through a PLC (1405C), a computer (1411C), and an AI robot (1505) in concert with achieved depths of the Z (cubic) volume of injected material.

Figure 5A:
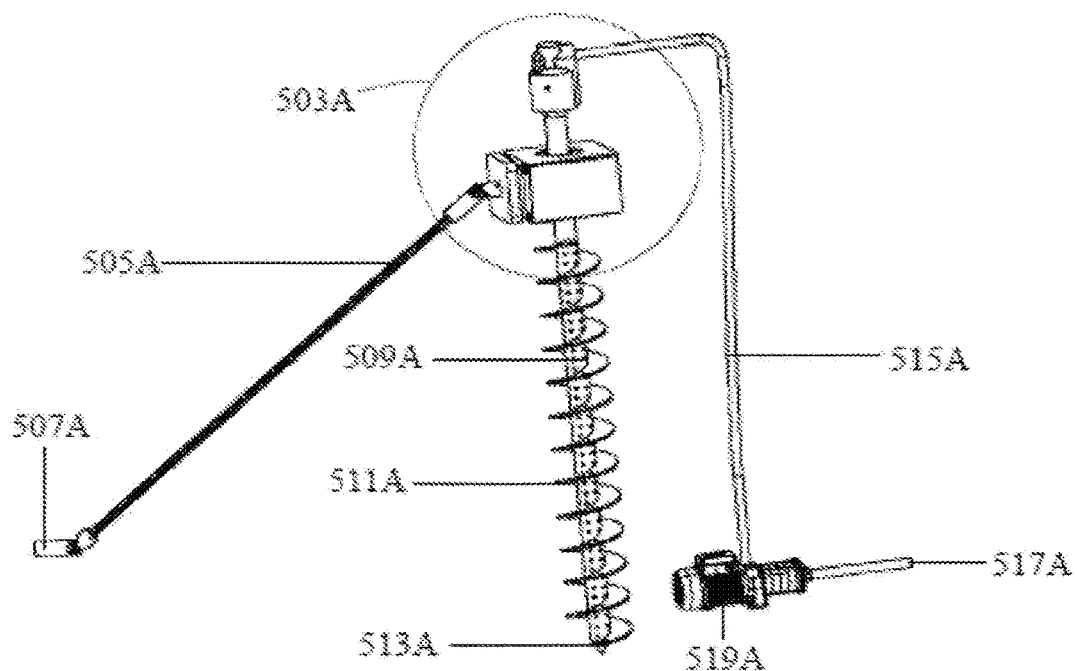
FIG. 5A illustrates a view of an exemplary injection drill bit assembly with PTO, pipe, pump, and valve, in accordance with at least one embodiment.
Figure 5B:
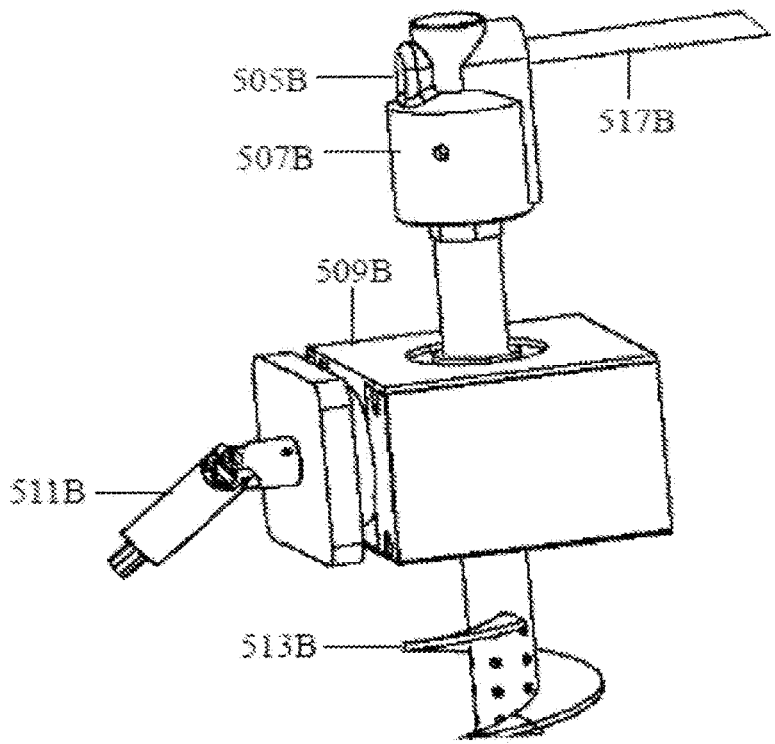
FIG. 5B illustrates a view of an exemplary close-up of FIG. 5A and call out of 503A including single pipe, single valve, with the rotary union, gearbox, and PTO, in accordance with at least one embodiment.

FIG. 5A illustrates a view of an exemplary injection drill bit assembly with PTO, pipe, pump, and valve, in accordance with at least one embodiment. FIG. 5B illustrates a view of an exemplary close-up of FIG. 5A and call out of 503A including single pipe, single valve, with the rotary union, gearbox, and PTO, in accordance with at least one embodiment. FIG. 5A and FIG. 5B are explained in conjunction with FIG. 4. FIG. 5A depicts a call-out for a close-up of FIG. 5b 503A, PTO extension shaft 505A, PTO pivot 507A, injection drill bit perforations 509A, injection drill bit screw rib 511A, injection drill bit screw hollow shaft tip 513A, constituent conduit 515A, and multiphase or DODA® pump 517A. FIG. 5B depicts valve 505B, rotary union 507B, gearbox 509B, PTO pivot 511B, injection drill bit screw rib 513B, injection drill bit perforations 515B, and constituent conduit 517B.

Figure 6A:
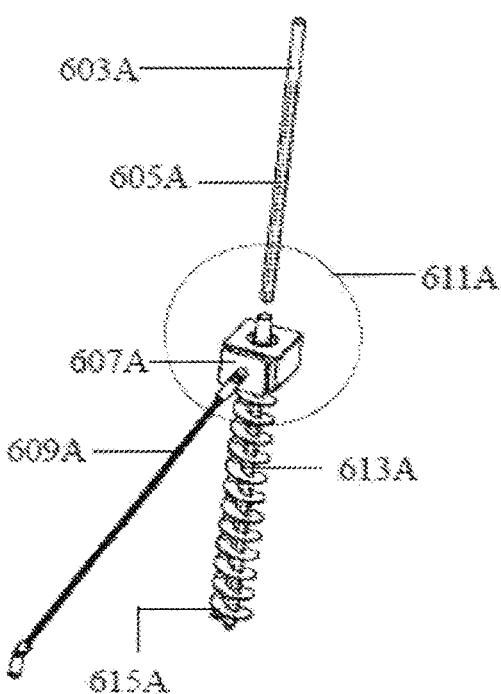
FIG. 6A illustrates a view of an exemplary injection drill bit assembly with gearbox and tube to be inserted, in accordance with at least one embodiment.
Figure 6B:
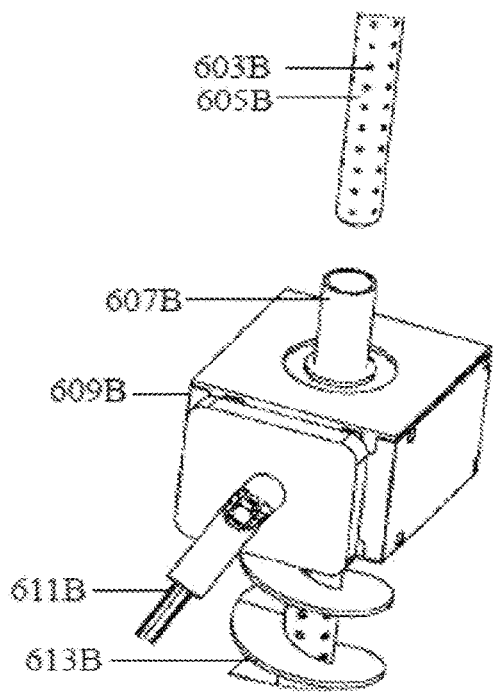
FIG. 6B illustrates a view of an exemplary close-up of FIG. 6A and close-up call out of 611A including perforated tube, gearbox, and PTO, in accordance with at least one embodiment.
Figure 6C:
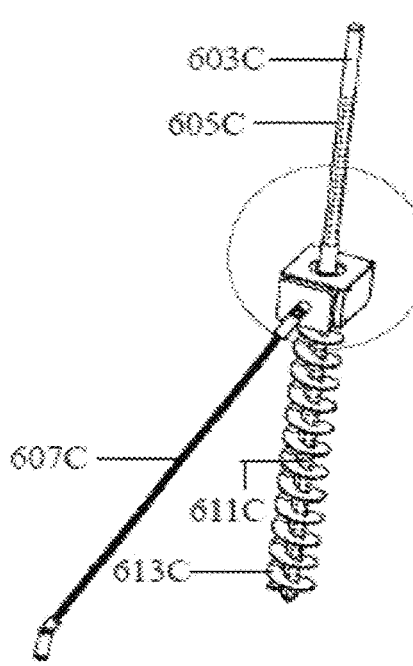
FIG. 6C illustrates a view of an exemplary injection drill bit assembly with gearbox and tube being inserted, in accordance with at least one embodiment.
Figure 6D:
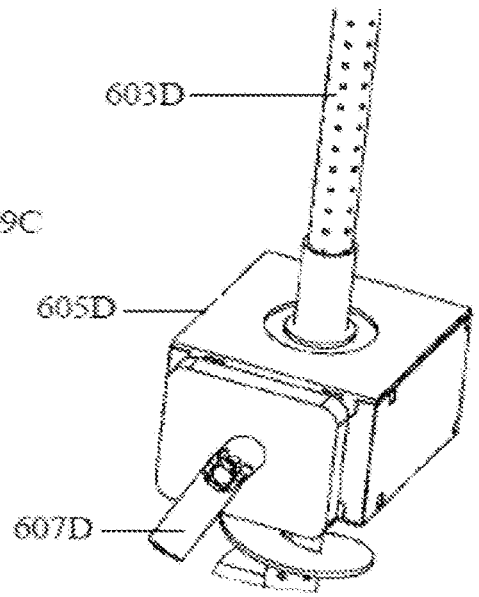
FIG. 6D illustrates a view of an exemplary close-up of FIG. 6C and close-up call out of 609C including partially inserted perforated tube, gearbox, and PTO, in accordance with at least one embodiment.

FIG. 6A illustrates a view of an exemplary injection drill bit assembly with gearbox and tube to be inserted, in accordance with at least one embodiment. FIG. 6B illustrates a view of an exemplary close-up of FIG. 6A and close-up call out of 611A including perforated tube, gearbox, and PTO, in accordance with at least one embodiment. FIG. 6C illustrates a view of an exemplary injection drill bit assembly with gearbox and tube being inserted, in accordance with at least one embodiment. FIG. 6D illustrates a view of an exemplary close-up of FIG. 6C and close-up call out of 609C including partially inserted perforated tube, gearbox, and PTO, in accordance with at least one embodiment. FIGS. 6A-6D are explained in conjunction with FIG. 1. FIG. 6A depicts injection drill bit tube 603A, perforations of drill bit tube 605A, gearbox 607A, PTO extension shaft 609A, close up call out for FIG. 6B 611A, injection drill bit rib 613A, and injection drill bit tip 615A. FIG. 6B depicts injection drill bit tube 603B, perforations of drill bit tube 605B, injection drill bit 607B, gearbox 609B, PTO shaft 611B, and injection drill bit rib 613B. FIG. 6C depicts injection drill bit tube 603C, perforations of drill bit tube 605C, PTO shaft 607C, close up call out for FIG. 6d 609C, injection drill bit perforation 611C, and injection drill bit rib 613C. FIG. 6D depicts inserted injection drill bit tube 603D, gearbox 605D, and PTO pivot 607D.

Figure 7A:
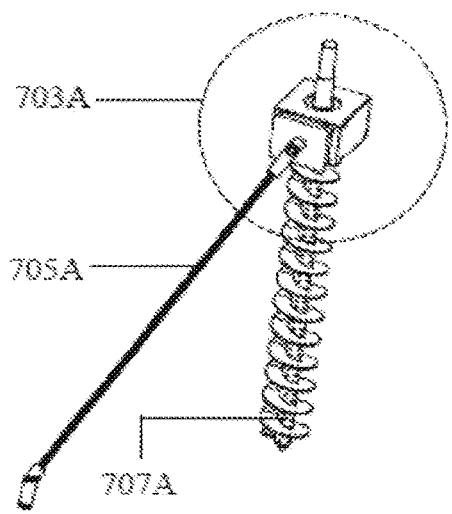
FIG. 7A illustrates a view of an exemplary injection drill bit assembly with gearbox and tube almost fully inserted, in accordance with at least one embodiment.
Figure 7B:
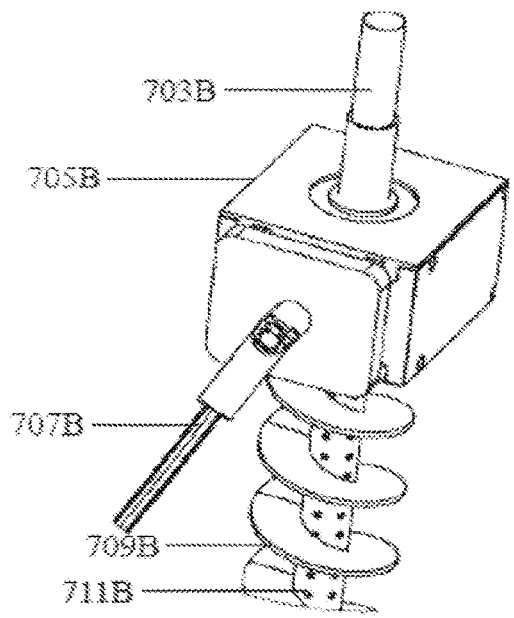
FIG. 7B illustrates a view of an exemplary close-up of FIG. 6A and close-up call out of 703A including almost fully inserted perforated tube, gearbox, and PTO, in accordance with at least one embodiment.
Figure 7C:
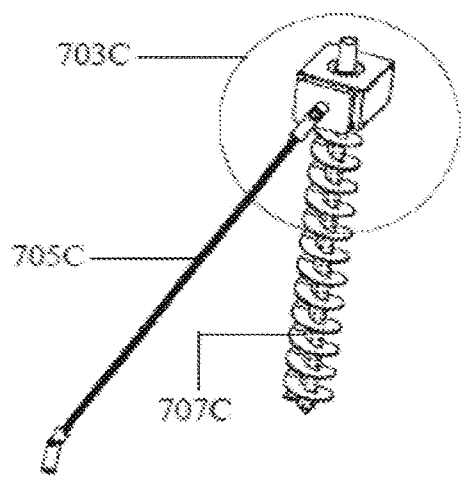
FIG. 7C illustrates a view of an exemplary injection drill bit assembly with gearbox and tube fully inserted, in accordance with at least one embodiment.
Figure 7D:
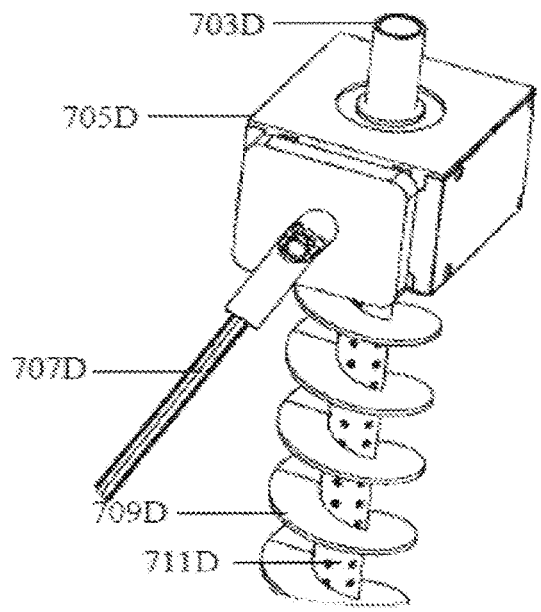
FIG. 7D illustrates a view of an exemplary close-up of FIG. 6C and close-up call out of 703C including fully inserted perforated tube, gearbox, and PTO, in accordance with at least one embodiment.

FIG. 7A illustrates a view of an exemplary injection drill bit assembly with gearbox and tube almost fully inserted, in accordance with at least one embodiment. FIG. 7B illustrates a view of an exemplary close-up of FIG. 6A and close-up call out of 703A including almost fully inserted perforated tube, gearbox, and PTO, in accordance with at least one embodiment. FIG. 7C illustrates a view of an exemplary injection drill bit assembly with gearbox and tube fully inserted, in accordance with at least one embodiment. FIG. 7D illustrates a view of an exemplary close-up of FIG. 6C and close-up call out of 703C including fully inserted perforated tube, gearbox, and PTO, in accordance with at least one embodiment. FIGS. 7A-7D are explained in conjunction with FIG. 1. FIG. 7A depicts a close-up call-out for FIG. 7B 703A, PTO extension shaft 705A, and injection drill bit perforation 707A. FIG. 7B depicts inserted injection drill bit tube 703B, gearbox 705B, PTO extension shaft 707B, injection drill bit rib 709B, and injection drill bit perforation 711B FIG. 7C depicts a close-up call-out for FIG. 7D 703C, PTO extension shaft 705C, and injection drill bit perforation 707C. FIG. 7D depicts fully inserted injection drill bit tube 703D, gearbox 705D, PTO extension shaft 707D, injection drill bit rib 709D, and injection drill bit perforation 711D.

Figure 8A:
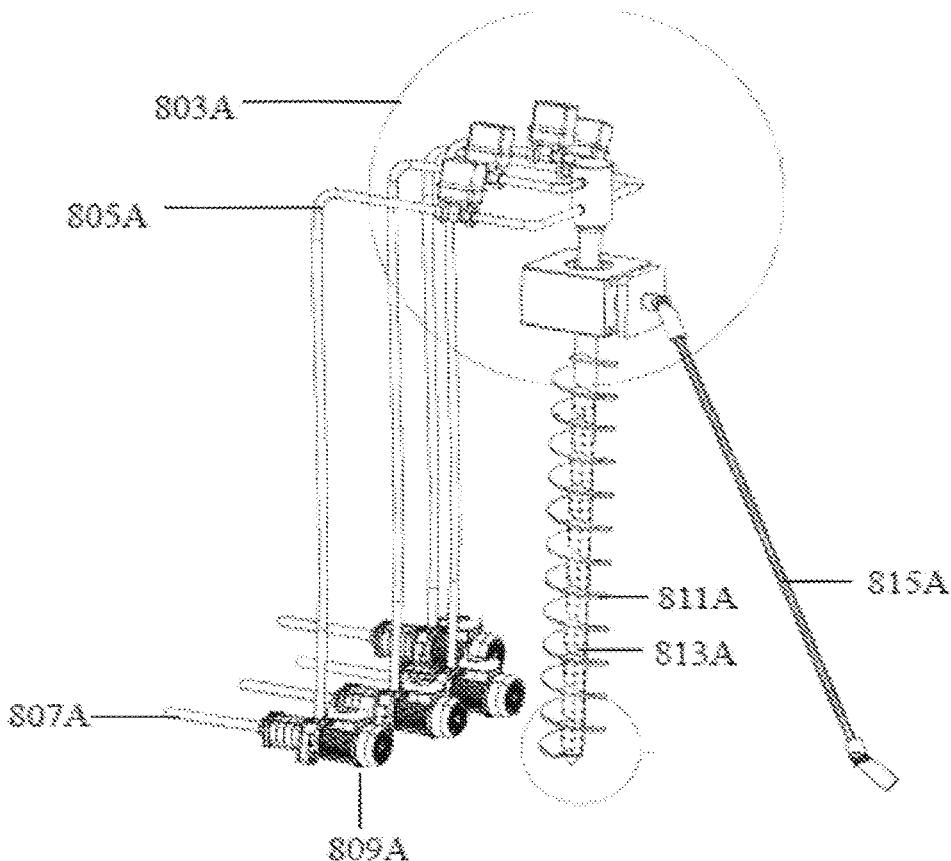
FIG. 8A illustrates a view of an exemplary injection drill bit assembly with pumps and valves, in accordance with at least one embodiment.
Figure 8B:
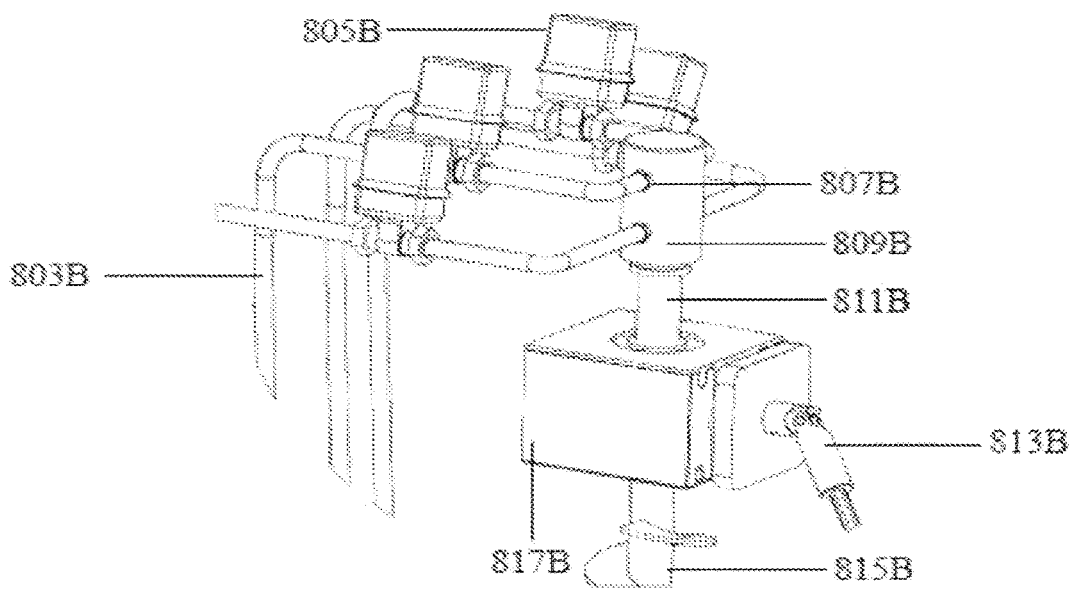
FIG. 8B illustrates a view of an exemplary close-up of FIG. A and call out of 803A an array of pipes, valves, with the rotary union, gearbox, and PTO, in accordance with at least one embodiment.

FIG. 8A illustrates a view of an exemplary injection drill bit assembly with pumps and valves, in accordance with at least one embodiment. FIG. 8B illustrates a view of an exemplary close-up of FIG. 8A and call out of 803A an array of pipes, valves, with the rotary union, gearbox, and PTO, in accordance with at least one embodiment. FIGS. 8A and 8B are explained in conjunction with FIG. 1. FIG. 8A depicts a close-up call-out for FIG. 8B 803A, constituent conduit 805A, constituent conduit 807A, multiphase or DODA® pump 809A, injection drill bit perforation 811A, injection drill bit rib 813A, and PTO extension shaft 815A. FIG. 8B depicts conduit 803B, valve 805B, conduit 807B, rotary union 809B, top of injection drill bit 811B, PTO pivot 81133, injection drill bit hollow stem 815B, and gearbox 817B.

Figure 9A:
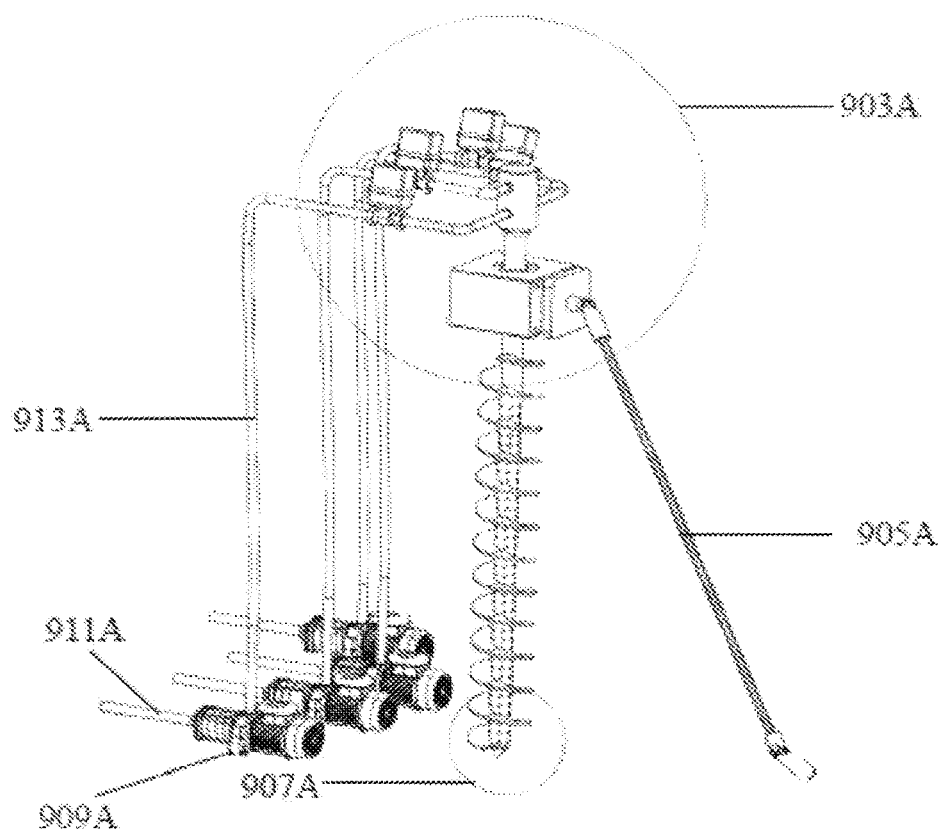
FIG. 9A illustrates a view of an exemplary injection drill bit assembly with pumps and valves, in accordance with at least one embodiment.
Figure 9B:
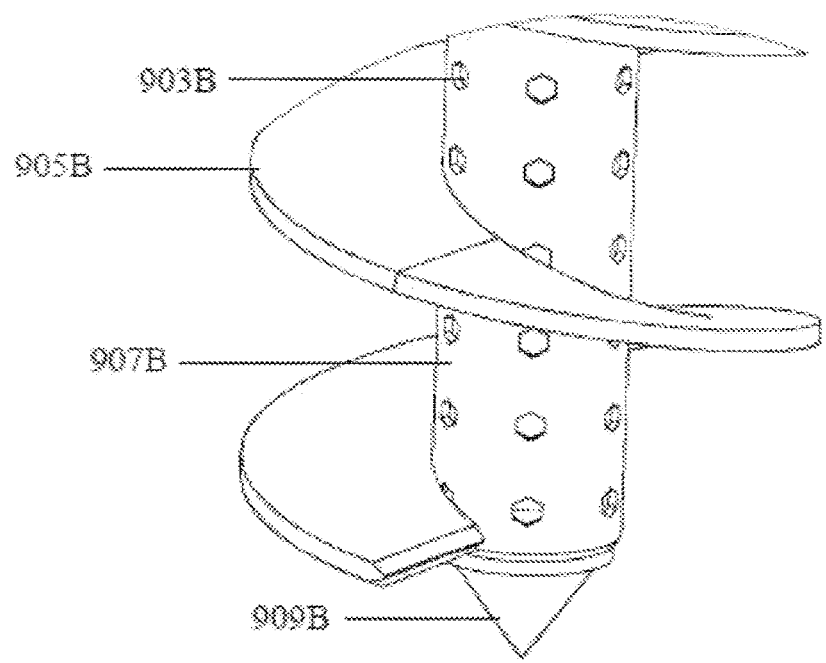
FIG. 9B illustrates a view of an exemplary close-up of FIG. 9A and call out of 907A lateral perforated injection drill bit, in accordance with at least one embodiment.

FIG. 9A illustrates a view of an exemplary injection drill bit assembly with pumps and valves, in accordance with at least one embodiment. FIG. 9B illustrates a view of an exemplary close-up of FIG. 9A and call out of 907A lateral perforated injection drill bit, in accordance with at least one embodiment. FIGS. 9A and 9B are explained in conjunction with FIG. 1. FIG. 9A depicts as seen in FIG. 8B 903A, PTO extension shaft 905A, call out for close up of FIG. 9B 907A, DODA® or multiphase pump 909A, conduit 911A, and conduit 913A. FIG. 9B depicts hexagon perforation 903B, injection drill bit rib 905B, injection drill bit hollow stem 907B, and injection drill bit tip 9098.

Figure 10B:
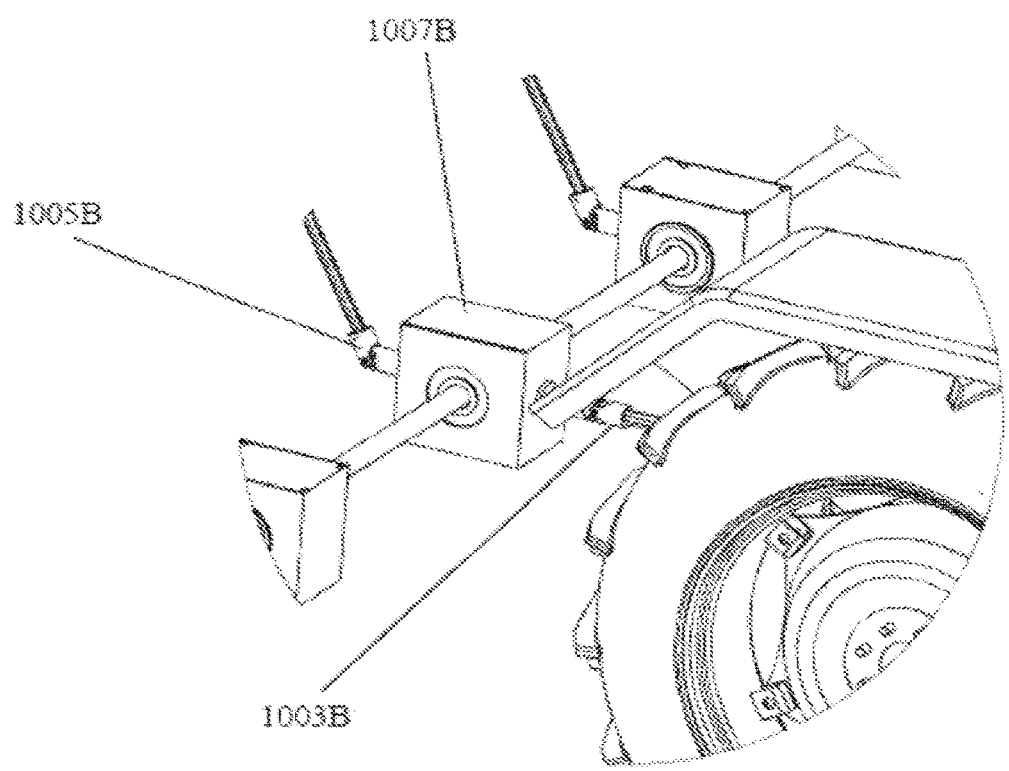
FIG. 10B illustrates a view of an exemplary close-up of FIG. 10A and call-out close-up of 1003A showing linear gearbox arrays, and power take-off extensions, in accordance with at least one embodiment.

FIG. 10A illustrates a view of an exemplary PTO-driven array of injection drill bits and associated valves, pumps, and pipes with gearbox close-up call out 11A, in accordance with at least one embodiment. FIG. 108 illustrates a view of an exemplary close-up of FIG. 10A and call-out close-up of 1003A showing linear gearbox arrays, and power take-off extensions, in accordance with at least one embodiment. FIGS. 10A and 10B are explained in conjunction with FIG. 1. FIG. 10A depicts call out for close up of gearbox array as seen in FIG. 10B 1003A. FIG. 10B depicts PTO 1003B, PTO pivot 1005B, and gearbox 1007B. The hollow shaft injection drilling arrays (1003A) provide the sequential dispensing of the constituents at one or more targeted depths, wherein the hollow shaft injection drilling arrays (1003A) enable capturing of targeted volumes of constituents thereby creating mono or poly constituent horizons. In an embodiment, the hollow shaft injection drilling arrays (1003A) enable one or more hollow shaft of drill bits (129) to be refilled with the constituents at specific depths to achieve volume efficacy. In an embodiment, the hollow shaft injection drilling arrays (1003A) enable subsurface injection of living organisms, other micro-organisms, bacteria, fungi, gases, liquid, damp, slurry, steam, wettable, and or dry constituents through the one or more hollow shaft injection drill bits (129). In an embodiment, the hollow shaft injection drilling arrays (1003A) enable time interval injection of the constituent to determine the volume to change soil porosity, wherein the encoders (1605B) calculate the time based on the revolutions and depth achievement of the encoders (16058). In an embodiment, the hollow shaft injection drilling arrays (1003A) inject horizontally or vertically during the descending drilling process. In an embodiment, the hollow shaft injection drilling arrays (1003A) inject horizontally or vertically during the ascending drilling process. In an embodiment, the hollow shaft injection drilling arrays (1003A) act independently or in concert during the ascending drilling process. In an embodiment, the hollow shaft injection drilling arrays (1003A) act independently or in concert during the descending drilling process. In an embodiment, the hollow shaft injection drilling arrays (1003A) enable a single injection drill bit or a plurality of injection drill bits to act independently. In an embodiment, the hollow shaft injection drilling arrays (1003A) enable independent member hollow shaft drill bits to individually stop drilling, or to stop at an interval of time. In an embodiment, the hollow shaft injection drilling arrays (1003A) enable independent member hollow shaft drill bits to individually stop drilling, or to stop at a specific depth. In an embodiment, the hollow shaft injection drilling arrays (1003A) enable independent hollow shaft drill bits to individually stop drilling upon Lidar mapping detection of specified impediments. In an embodiment, the hollow shaft injection drilling arrays (1003A) enable independent hollow shaft drill bits to individually stop drilling upon slowed revolutions (1605B) encoder detection indicates specified resistance. In an embodiment, the hollow shaft injection drilling arrays (1003A) are enabled via the AI (artificial intelligence) robot (1505), the PLC (1405C), the computer (1411C), a database, the GPS (1413C), lidar and or other subsurface map overlay to prescribe subsurface actions. In an embodiment, the hollow shaft injection drilling arrays (1003A) enable via the encoder (1605B) data act as an inference for the AI robot (1505), the PLC (1405C), the computer (1411C), and the database of soil type porosity and tightness dynamically interpreting revolution speed resistance to the hollow shaft injection drill bit. In an embodiment, the hollow shaft injection drilling arrays (1003A) enable strata by strata data from core samples with the GPS (1413C) coordinates to enable proper RPM range for hollow shaft injection drill bit motors, or PTO to protect from damage. In an embodiment, the hollow shaft injection drilling arrays (1003A) enable the database of soil type to dynamically interact with shaft injection drill bit variable speed PTO and or motors to protect from damage. In an embodiment, the hollow shaft injection drilling arrays (1003A) enable the dynamic sample recording of information to the PLC (1405C) and the computer (1411C) local or cloud of specific injection depths at the GPS (1413C) location including date stamp. In an embodiment, the hollow shaft injection drilling arrays (1003A) enable dynamic recording of information to the PLC (1405C) and the computer (1411C) local or cloud of specific depth and volume dispensed of specific Constituent at the GPS (1413C) location including date stamp. In an embodiment, the hollow shaft injection drilling arrays (1003A) enable subsurface instrument and or sensor introduction and recordation through the hollow shaft of the drill bit (129) and its apertures and or perforations to take specific readings. In an embodiment, the hollow shaft injection drilling arrays (1003A) enable arrays and/or individual member hollow shaft drill bits within the array to independently be controlled by the AI robot (1505), the PLC (1405C), the computer (1411C) for maximum or minimum depth based on constituent prescription. In an embodiment, the hollow shaft injection drilling arrays (1003A) enable any exterior surface of a hollow shaft drill bit to be a carrier of Constituents for sub-surface kinetic release. In an embodiment, the hollow shaft injection drilling arrays (1003A) enable any exterior surface of a hollow shaft drill bit to be coated with adhesives and then with abrasives to mitigate smearing. In an embodiment, the hollow shaft injection drilling arrays (1003A) enable any perforation(s) cavity of a hollow shaft drill bit to be coated with adhesives and then with abrasives to mitigate smearing. In an embodiment, the hollow shaft injection drilling arrays (1003A) enable any perforation(s) cavity of a hollow shaft drill bit to be filled with a Constituent to be ejected at specific depths.

Figure 11A:
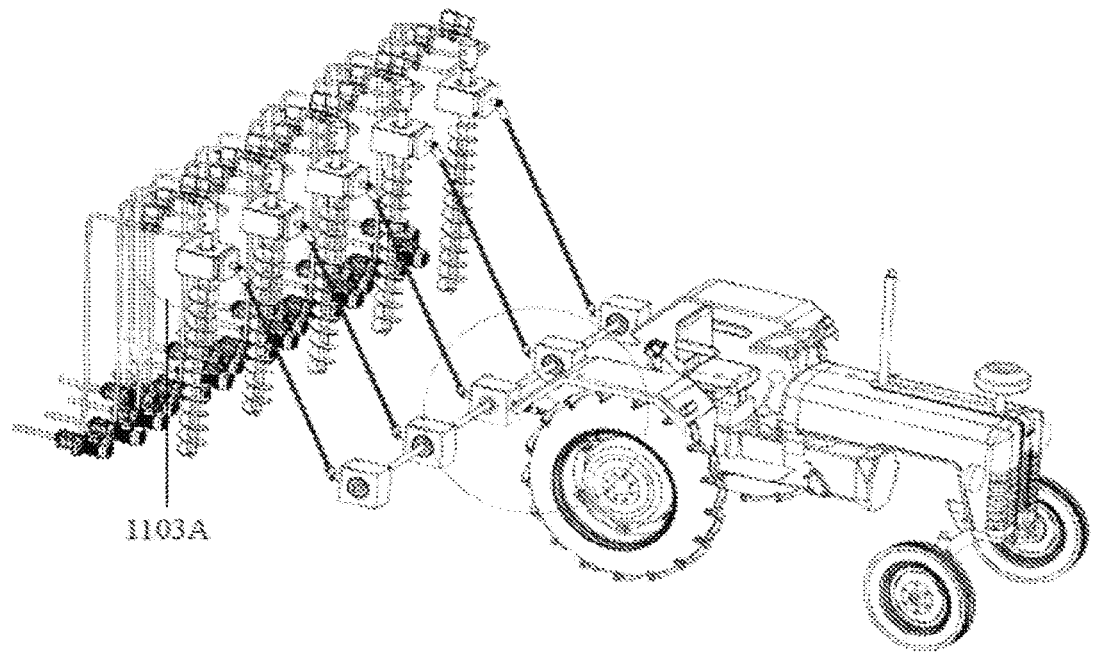
FIG. 11A illustrates a view of an exemplary PTO-driven array of injection drill bits and associated valves, pumps, and pipes with gearbox close-up call out 11A, in accordance with at least one embodiment.
Figure 11B:
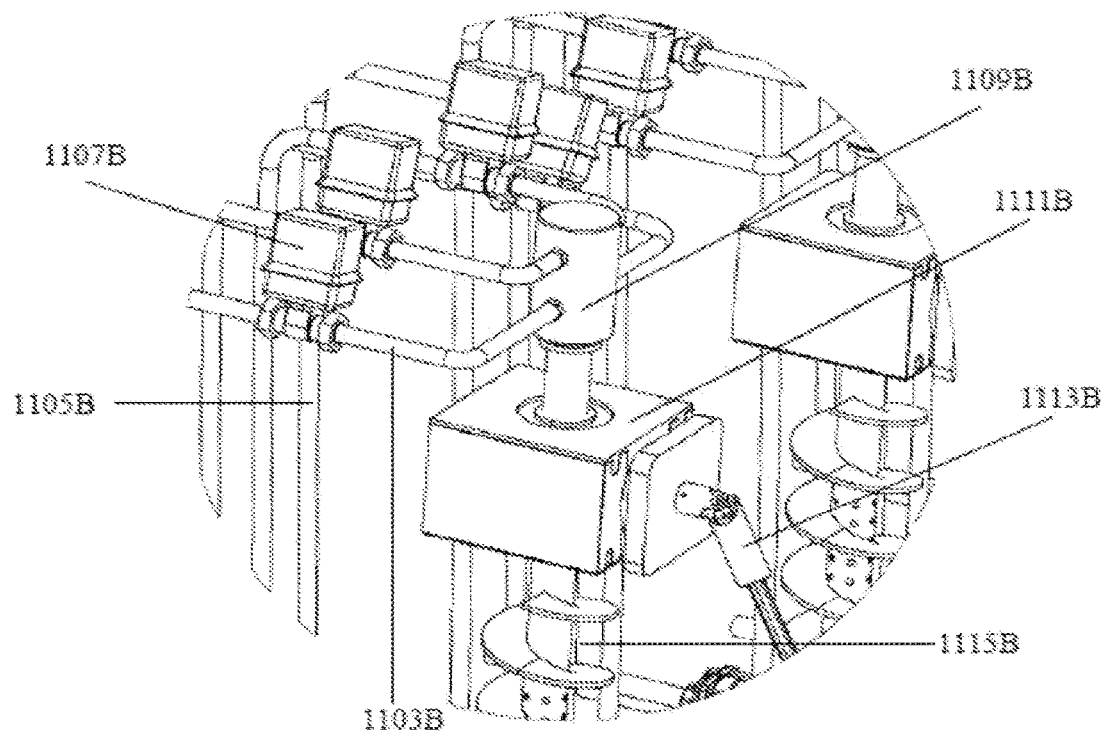
FIG. 11B illustrates a view of an exemplary close-up of FIG. 9 and call out a close-up of 903A showing rotary unions, valves, piping, gear boxes, and injection drill bits, in accordance with at least one embodiment.

FIG. 11A illustrates a view of an exemplary PTO-driven array of injection drill bits and associated valves, pumps, and pipes with gearbox close-up call out #11A, in accordance with at least one embodiment. FIG. 11B illustrates a view of an exemplary close-up of FIG. 9 and call out a close-up of 903A showing rotary unions, valves, piping, gearboxes, and injection drill bits, in accordance with at least one embodiment. FIGS. 11A and 11B are explained in conjunction with FIG. 1. FIG. 11A depicts a close-up of one of the five injection drill bit array 1103A, and as seen in FIG. 10B 1105A. FIG. 11B depicts conduit 1103B, conduit 1105B, valve 1107B, rotary union 1109B, gearbox 1111B, PTO pivot 1113B, and injection drill bit hollow stem 1115B.

Figure 12:
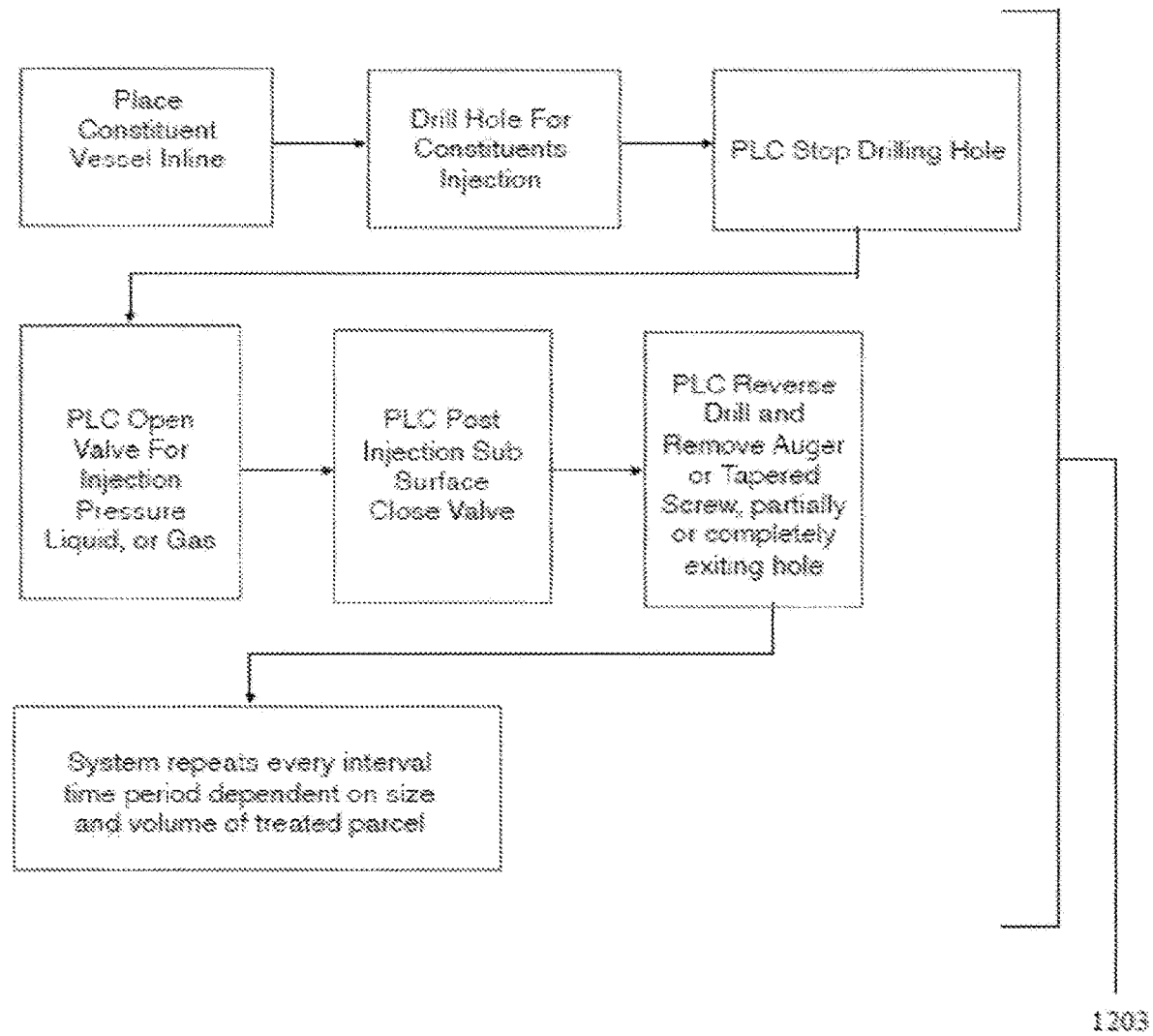
FIG. 12 illustrates a view of an exemplary PLC process diagram for constituent injections, in accordance with at least one embodiment.

FIG. 12 illustrates a view of an exemplary PLC process diagram for constituent injections, in accordance with at least one embodiment. FIG. 12 is explained in conjunction with FIG. 1. FIG. 12 depicts steps in the PLC process for constituent injections 1203.

Figure 13:
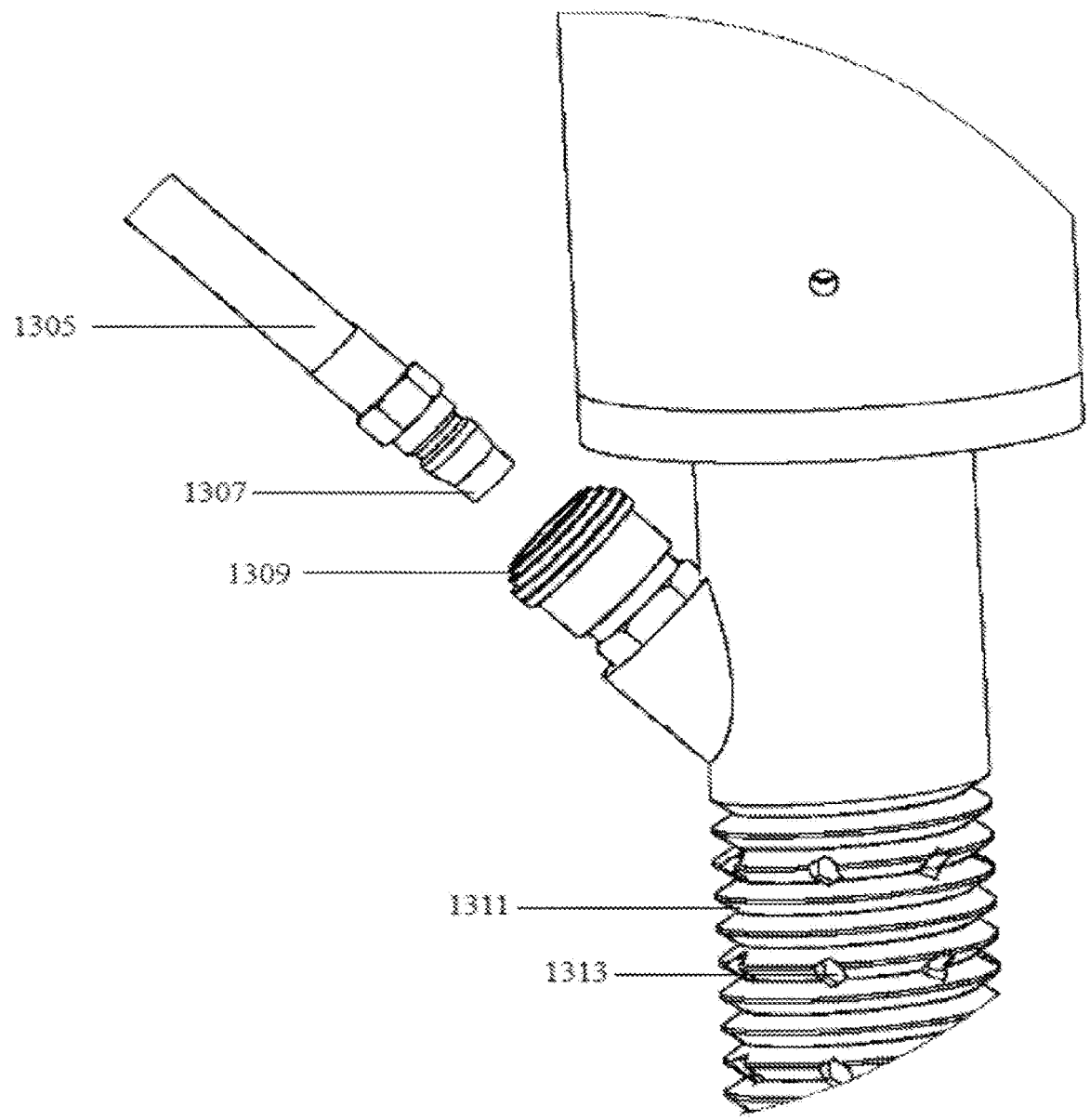
FIG. 13 illustrates a close-up view of an exemplary single drill injection robotic controlled unit quick connect and perforated hollow shaft injection drill bit, in accordance with at least one embodiment.

FIG. 13 illustrates a close-up view of an exemplary single drill injection robotic controlled unit quick connect and perforated hollow shaft injection drill bit, in accordance with at least one embodiment. FIG. 13 is explained in conjunction with FIG. 1. FIG. 13 depicts pressure conduit 1305, female quick release 1307, male quick release and or socket 1309, single drill injection bit screw thread 1311, single drill injection bit screw hexagon perforation 1313. In an embodiment, the rotary union (113) can be fed by the input conduit or the flex pipe (105) that are connected via a female quick-connect (1307), and a male quick disconnect (1309).

FIG. 14A illustrates a view of an exemplary communications platform of an injection drilling trailer with components seen in FIG. 14B and FIG. 14C, in accordance with at least one embodiment. FIG. 14 B illustrates a view of an exemplary satellite communications dish, in accordance with at least one embodiment. FIG. 14 C illustrates a view of an exemplary close-up of components within a circle of FIGS. 14A and 1405A, in accordance with at least one embodiment. FIGS. 14A, 14B, and 14C, are explained in conjunction with FIG. 1. FIG. 14A depicts satellite communications dish 1403A, and a communications platform containing components seen in FIG. 6C 1405A. FIG. 14B depicts satellite communications dish 1403B. FIG. 14C depicts fuel cell 1403C, PLC 1405C, AI robot 1407C, router 1409C, and computer 1411C. In an embodiment, the rotary union (113) comprises an input conduit or a flex pipe (105) to disperse in the sequence with varied times of a programmable logic controller (PLC)(1405C), a computer (1411C), or the AI robot (1505) controlled prescription for an amendment. The hollow shaft injection drilling arrays (1003A) have tips that are interchangeable in some designs with a plethora of drill bits tips (513A) based on ternary soil type or proximity to GPS (1413C) plotted populated horticulture perennials. In an embodiment, the hollow shaft injection drilling arrays (1003A) are limited to a depth at a specific GPS (1413C) location. In an embodiment, the hollow shaft injection drilling arrays (1003A) may be individually limited to the depth at a specific GPS (1413C) location. In an embodiment, the hollow shaft injection drilling arrays (1003A) turned off at specific GPS (1413C) locations. In an embodiment, the hollow shaft injection drilling arrays (1003A) platforms vibration and torque are dampened by granite. In an embodiment, the hollow shaft injection drilling arrays (1003A) platforms torque is dampened by layered elastomers.

Figure 15:
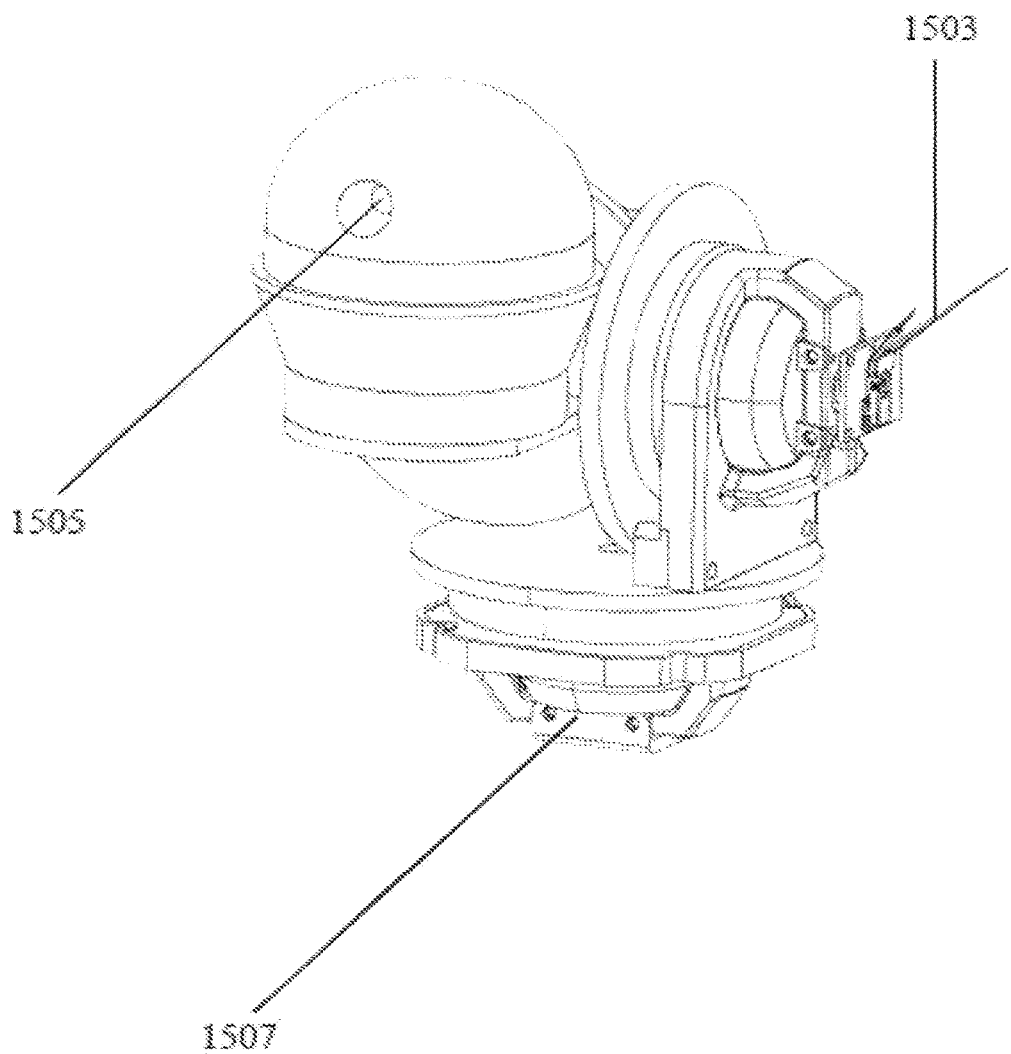
FIG. 15 illustrates a view of an exemplary AI Robot, in accordance with at least one embodiment.

FIG. 15 illustrates a view of an exemplary AI robot (1505), in accordance with at least one embodiment. FIG. 15 is explained in conjunction with FIG. 1. FIG. 15 depicts camera lens 1503, gimbal 1505, and antenna 1507. The AI robot (1505) comprises an AI robot lens to assess the depth of the platform above ground to determine the targeted descent or ascent of any part of an auger assembly and how far it has traveled for the filling of and subsequent ejection of the hollow shaft of the injection drill bit contents.

Figure 16A:
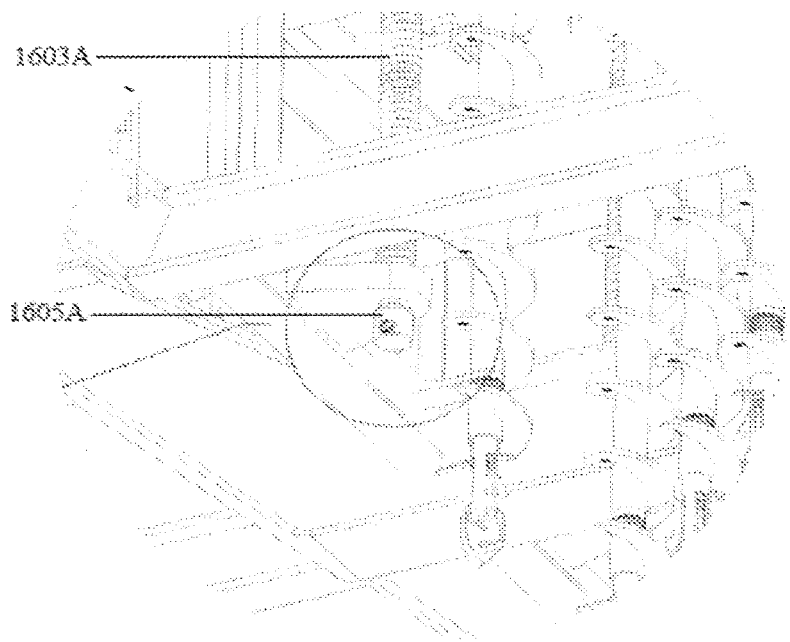
FIG. 16A illustrates a view of an exemplary encoder for lead screw revolution counting, in accordance with at least one embodiment.
Figure 16B:
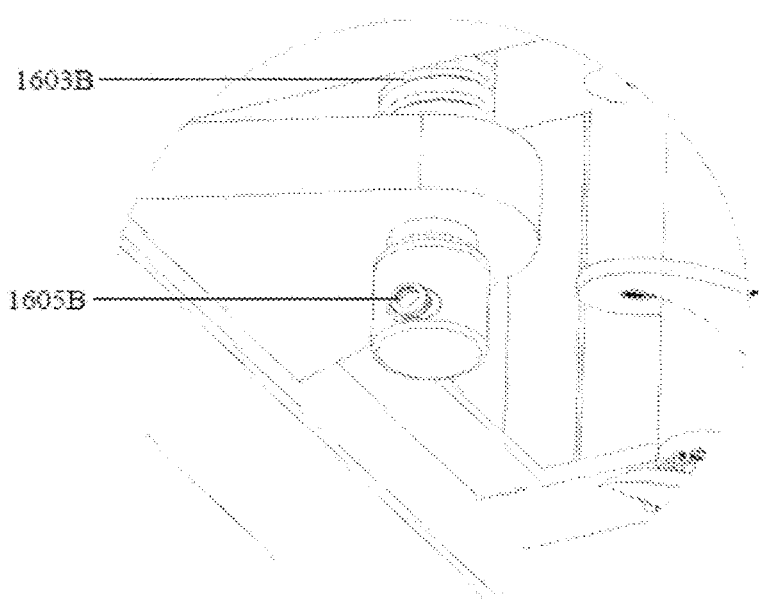
FIG. 16B illustrates an exemplary view of a close-up of FIG. 16A of an encoder for lead screw revolution counting, in accordance with at least one embodiment.

FIG. 16A illustrates a view of an exemplary encoder for lead screw revolution counting, in accordance with at least one embodiment. FIG. 16B illustrates an exemplary view of a close-up of FIG. 16A of an encoder for lead screw revolution counting, in accordance with at least one embodiment. FIGS. 16A and 16B are explained in conjunction with FIG. 1. FIG. 16A depicts lead screw 1603A, and encoder 1605A. FIG. 16B depicts lead screw 1603B, and encoder 1605B. The encoder (1605B) revolutions per minute equal soil density by ternary scale (resistance) that can be measured by the resistance of revolutions per minute. This density and or resistance by retardation of normal revolutions can as a formula variable dynamically determine the amount of Constituent liquid to solids ratio. In an embodiment, the encoder (1605B) revolutions per minute equal soil density by ternary scale (resistance) that can be measured by the resistance of revolutions per minute. In Clays, this density and or resistance by retardation of normal revolutions can determine the amount of added abrasives. In an embodiment, the encoder (1605B) determines the targeted depth of any part of the auger assembly and how far it has traveled for the ejection hollow shaft drilling bit constituent contents.

Figure 17:
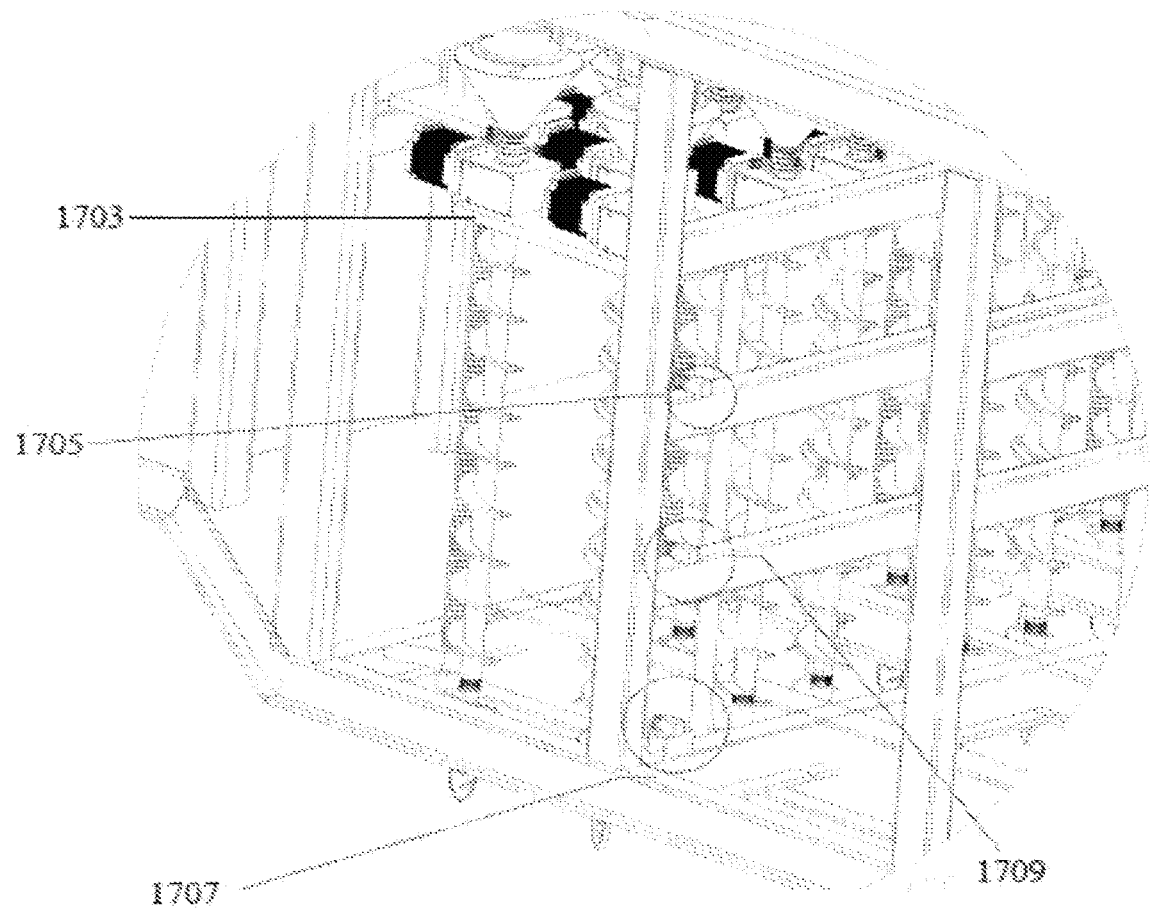
FIG. 17 illustrates a view of an exemplary view of three Limit Switches, in accordance with at least one embodiment.

FIG. 17 illustrates a view of an exemplary view of three Limit Switches, in accordance with at least one embodiment. FIG. 17 is explained in conjunction with FIGS. 1, 15, and 16. FIG. 17 depicts injection drill bit array platform 1703, limit switch 1705, limit switch 1707, and limit switch 1709. The hollow shaft injection drilling arrays (1003A) are enabled by the plurality of limit switches (1705, 1707, 1709), the plurality of encoders (1605B), and the AI robot (1505) to sequence the constituents to be injected at specific depths.

Figure 18A:
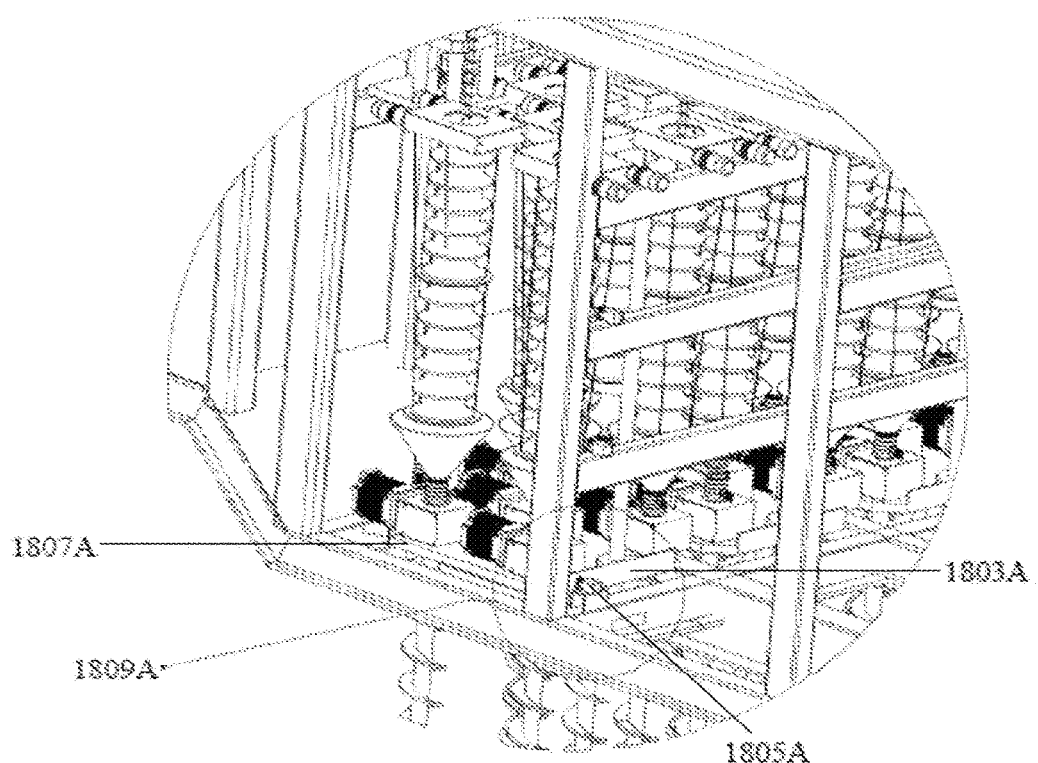
FIG. 18 A illustrates a view of an exemplary limit switch that has been tripped by the Injection Drilling Array Platform having traveled to its limit setting, in accordance with at least one embodiment.
Figure 18B:
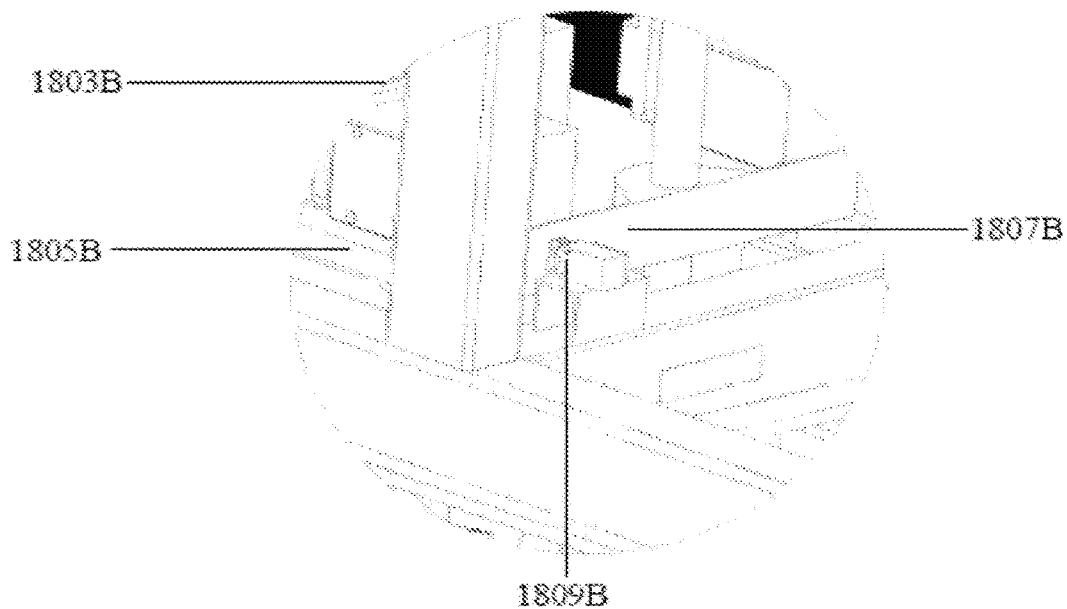

FIG. 18A illustrates a view of an exemplary limit switch that has been tripped by the Injection Drilling Array Platform having traveled to its limit setting, in accordance with at least one embodiment. FIG. 18B illustrates an exemplary view of a close-up of FIG. 18A, in accordance with at least one embodiment. FIGS. 18A and 18B are explained in conjunction with FIG. 1. FIG. 18A depicts the back wall of drilling array platform 1803A, limit switch 1805A, drilling array platform 1807A, and call out for close up of FIG. JOB 1809A. FIG. 18B depicts a close-up of FIGS. 10A and 1009A 1803B, drilling array platform 1805B, the back wall of drilling array platform 1807B, and limit switch 1809B. The limit switch (1809B) determines depth, in some cases a max depth for the platform above ground which can determine targeted descent or ascent and how specific points of achieved traveled limits for the ejection hollow shaft drilling bit constituent contents.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms enclosed. On the contrary, the intention is to cover all modifications, alternative constructions, and equivalents falling within the spirit and scope of the invention, as defined in the appended claims. Thus, it is intended that the present invention cover the modifications and variations of this invention, provided they are within the scope of the appended claims and their equivalents.

FIG. 1

103 DODA® or Multiphase Pump
105 Input Conduit or Flex Pipe
107 Conduit
109 Motor
111 Valve
113 Rotary Union
115 Call Out for Close Up of FIG. 2
117 Platform Motion Lead Screw
119 Fuel Cell
121 Rail Support Structure

123 Platform
125 Platform Guide
127 Injection Drilling Perforation
129 Hollow Shaft Injection Drilling Bit
131 Fuel Cell
133 Platform Motor

FIG. 2

203 Motor
205 Motor Support
207 Motor Platform Motion Screw Shaft Interface
209 Platform Guide
211 Platform Motion Lead Screw Shaft
213 Conduit
215 Valve
217 Rotary Union

FIG. 3

303 Platform Lead Motion Screw Shaft Interface
305 Platform Lead Motion Shaft Interface

FIG. 4

403 Left Side View of FIG. 1 assembly

FIG. 5A

503A Call Out for Close Up of FIG. 5B
505A PTO Extension Shaft
507A PTO Pivot
509A Injection Drill Bit Perforations
511A Injection Drill Bit Screw Rib
513A Injection Drill Bit Screw Hollow Shaft Tip
515A Constituent Conduit
517A Multiphase or DODA® Pump

FIG. 5B

505B Valve
507B Rotary Union
509B Gear Box
511B PTO Pivot
513B Injection Drill Bit Screw Rib
515B Injection Drill Bit Perforations
517B Constituent Conduit

FIG. 6A

603A Injection Drill Bit Tube
605A Perforations of Drill Bit Tube
607A Gear Box
609A PTO Extension Shaft
611A Close Up call out for FIG. 6B
613A Injection Drill Bit Rib
615A Injection Drill Bit Tip

FIG. 6B

603B Injection Drill Bit Tube
605B Perforations of Drill Bit Tube
607B Injection Drill Bit
609B Gear Box
611B PTO Shaft
6138 Injection Drill Bit Rib

FIG. 6C

603C Injection Drill Bit Tube
605C Perforations of Drill Bit Tube
607C PTO Shaft
609C Close Up call out for FIG. 6D
611C Injection Drill Bit Perforation
613C Injection Drill Bit Rib

FIG. 6D

603D Inserted Injection Drill Bit Tube
605D Gear Box
607D PTO Pivot

FIG. 7A

703A Close Up call out for FIG. 7B
705A PTO Extension Shaft
707A Injection Drill Bit Perforation

FIG. 7B

703B Inserted Injection Drill Bit Tube
705B Gear Box
707B PTO Extension Shaft
709B Injection Drill Bit Rib
711B Injection Drill Bit Perforation

FIG. 7C

703C Close Up call out for FIG. 7D
705C PTO Extension Shaft
707C Injection Drill Bit Perforation

FIG. 7D

703D Fully Inserted Injection Drill Bit Tube
705D Gear Box
707D PTO Extension Shaft
709D Injection Drill Bit Rib
711D Injection Drill Bit Perforation

FIG. 8A

803A Close Up call out for FIG. 8B
805A Constituent Conduit
807A Constituent Conduit
809A Multiphase or DODA® Pump
811A Injection Drill Bit Perforation
813A Injection Drill Bit Rib
815A PTO Extension Shaft

FIG. 8B

803B Conduit
805B Valve
807B Conduit
809B Rotary Union
811B Top of Injection Drill Bit
813B PTO Pivot
815B Injection Drill Bit Hollow Stem
817B Gear Box

FIG. 9A

903A As seen in FIG. 8B
905A PTO Extension Shaft

907A Call out for Close up of FIG. 9B
909A DODA® or Multiphase Pump
911A Conduit
913A Conduit

FIG. 9B

903B Hexagon Perforation
905B Injection Drill Bit Rib
907B Injection Drill Bit Hollow Stem
909B Injection Drill Bit Tip

FIG. 10A

1003A Call out for close up of Gear Box Array as seen in FIG. 10B

FIG. 10B

1003B PTO
1005B PTO Pivot
1007B Gear Box

FIG. 11A

1103A Close Up of one of the five Injection Drill Bit Array
1105A Seen in FIG. 10B

FIG. 11B

1103B Conduit
1105B Conduit
1107B Valve
1109B Rotary Union
1111B Gear Box
1113B PTO Pivot
1115B Injection Drill Bit Hollow Stem

FIG. 12

1203 Steps in the PLC process for constituent injections

FIG. 13

1305 Pressure Conduit
1307 Female Quick Release
1309 Male Quick Release and or Socket
1311 Single Drill Injection Bit Screw Thread
1313 Single Drill Injection Bit Screw Hexagon Perforation

FIG. 14A

1403A Satellite communications dish
1405A Communications platform containing components seen in FIG. 6C

FIG. 14B

1403B Satellite Communications Dish

FIG. 14C

1403C Fuel Cell
1405C PLC
1407C AI Robot
1409C Router

1411C Computer

FIG. 15

1503 Camera Lens
1505 Gimbal
1507 Antenna

FIG. 16A

1603A Lead Screw
1605A Encoder

FIG. 16B

1603B Lead Screw
1605B Encoder

FIG. 17

1703 Injection Drill Bit Array Platform
1705 Limit Switch
1707 Limit Switch
1709 Limit Switch

FIG. 18A

1803A Back Wall of Drilling Array Platform
1805A Limit Switch
1807A Drilling Array Platform
1809A Call Out for Close Up of FIG. 10B

FIG. 18B

1803B Close Up of FIG. 10A and #1009A
1805B Drilling Array Platform
1807B Back Wall of Drilling Array Platform
1809B Limit Switch

The invention claimed is:
1. An apparatus for sub-surface injection of a plurality of constituents of a slurry, wet mixture, and or gas in a phase of entrainment for controlled flow, the apparatus comprising:
   a rotary union to facilitate filling of one of the plurality of constituents in one or more hollow shaft drill bits during a drilling process or before the drilling process via an opening and closing of a plurality of valves, wherein the plurality of constituents comprises one or more of a slurry, solution, cold steam or hot steam, suspension, colloid, and a damp substance or a dry substance capable of being injected through the rotary union, wherein the rotary union is in concert with a valve to dispense predefined quantities of constituents at a specific depth in a sequence of dispersal;
   a drilling assembly directed by a global positioning satellite (GPS) to control an X plane, and a Y-plane injection coordinates, wherein the drilling assembly determines through a PLC, a computer, and an AI robot in concert with achieved depths the Z (cubic) volume of injected material;
   a plurality of hollow shaft injection drilling arrays to provide the sequential dispensing of the constituents at one or more targeted depths, wherein the hollow shaft injection drilling arrays enable capturing of targeted volumes of constituents thereby creating mono or poly constituent horizons;
   a plurality of limit switches; and a plurality of encoders, wherein the hollow shaft injection drilling arrays are enabled by the plurality of limit switches, the plurality of encoders, and the AI robot to sequence the constituents to be injected at specific depths, wherein the hollow shaft injection drilling arrays enable time interval injection of one of the plurality of the constituents to determine the volume to change soil porosity, wherein the encoders calculate the time based on revolutions and depth achievement of the encoders.

2. The apparatus as claimed in claim 1, wherein the rotary union enables one or more multiphase pumps and a conduit piping of the one or more multiphase pumps to fill the hollow shaft drill bit.

3. The apparatus as claimed in claim 1, wherein the rotary union disperses the phase changed colloids or gas under pressure through the hollow shaft drill bit.

4. The apparatus as claimed in claim 1, wherein the rotary union comprises an input conduit or a flex pipe to disperse in the sequence with varied times of a programmable logic controller (PLC), a computer, or the AI robot controlled prescription for an amendment.

5. The apparatus as claimed in claim 1, wherein the rotary union rotation can be turned on or off based on filling sequence or ejection prescription volume.

6. The apparatus as claimed in claim 1, wherein the rotary union can be fed with an input conduit or a flex pipe (105).

7. The apparatus as claimed in claim 1, wherein the rotary union can be fed by an input conduit or a flex pipe that is connected via a female quick-connect, and a male quick disconnect.

8. The apparatus as claimed in claim 1, wherein the rotary union turns in conjunction with one or more of a PTO, a gearbox, a lead screw, a pump, or a gearbox assembly.

9. The apparatus as claimed in claim 1, wherein the hollow shaft injection drilling arrays enable the one or more hollow shaft drill bits to be refilled with the constituents at specific depths to achieve volume efficacy.

10. The apparatus as claimed in claim 1, wherein the hollow shaft injection drilling arrays enable subsurface injection of living organisms, other micro-organisms, bacteria, fungi, gases, liquid, damp, slurry, steam, wettable and/or dry constituents through the one or more hollow shaft drill bits.

11. The apparatus as claimed in claim 1, wherein the hollow shaft injection drilling arrays inject horizontally or vertically during a descending drilling process.

12. The apparatus as claimed in claim 1, wherein the hollow shaft injection drilling arrays inject horizontally or vertically during an ascending drilling process.

13. The apparatus as claimed in claim 1, wherein the hollow shaft injection drilling arrays act independently or in concert during an ascending drilling process.

14. The apparatus as claimed in claim 1, wherein the hollow shaft injection drilling arrays act independently or in concert during a descending drilling process.

15. The apparatus as claimed in claim 1, wherein the hollow shaft injection drilling arrays enable a single hollow shaft drill bit or a plurality of hollow shaft drill bits to act independently.

16. The apparatus as claimed in claim 1, wherein the hollow shaft injection drilling arrays enable independent ones of the hollow shaft drill bits to individually stop drilling, or to stop at an interval of time.

17. The apparatus as claimed in claim 1, wherein the hollow shaft injection drilling arrays enable independent ones of the hollow shaft drill bits to individually stop drilling, or to stop at a specific depth.

18. The apparatus as claimed in claim 1, wherein the hollow shaft injection drilling arrays enable independent ones of the hollow shaft drill bits to individually stop drilling upon Lidar Mapping detection of specified impediments.

19. The apparatus as claimed in claim 1, wherein the hollow shaft injection drilling arrays are enabled via the AI (artificial intelligence) robot, the PLC, the computer, a database, the GPS, lidar and/or other subsurface map overlay to prescribe subsurface actions.

20. The apparatus as claimed in claim 1, wherein the hollow shaft injection drilling arrays enable a database of soil type to dynamically interact with a motor and/or variable speed PTO driving the hollow shaft drill bit to protect from damage.

21. The apparatus as claimed in claim 1, wherein the hollow shaft injection drilling arrays enable dynamic sample recording of information to the PLC and the computer, local or cloud, of specific injection depths at the GPS location including date stamp.

22. The apparatus as claimed in claim 1, wherein the hollow shaft injection drilling arrays enable dynamic recording of information to the PLC and the computer, local or cloud, of specific depth and volume dispensed of specific ones of the plurality of constituents at the GPS location including a date stamp.

23. The apparatus as claimed in claim 1, wherein the hollow shaft injection drilling arrays enable subsurface instrument and/or sensor introduction and recordation through the hollow shaft drill bit and apertures and/or perforations of the hollow shaft drill bit, to take specific readings.

24. The apparatus as claimed in claim 1, wherein the hollow shaft injection drilling arrays enable arrays and/or individual ones of the hollow shaft drill bits within the array to independently be controlled by the AI robot, the PLC, or the computer to reach a maximum or minimum depth based on constituent prescription.

25. The apparatus as claimed in claim 1, wherein the hollow shaft injection drilling arrays enable an exterior surface of the hollow shaft drill bit to be a carrier of Constituents for sub-surface kinetic release.

26. The apparatus as claimed in claim 1, wherein the hollow shaft injection drilling arrays enable an exterior surface of the hollow shaft drill bit to be coated with adhesives and then with abrasives to mitigate smearing.

27. The apparatus as claimed in claim 1, wherein the hollow shaft injection drilling arrays enable a perforation(s) cavity of the hollow shaft drill bit to be coated with adhesives and then with abrasives to mitigate smearing.

28. The apparatus as claimed in claim 1, wherein the hollow shaft injection drilling arrays enable a perforation(s) cavity of the hollow shaft drill bit to be filled with a Constituent to be ejected at specific depths.

29. The apparatus as claimed in claim 1, wherein the hollow shaft injection drilling arrays have tips that are interchangeable with a plethora of drill bits tips based on a ternary soil type or a proximity to GPS plotted populated horticulture perennials.

30. The apparatus as claimed in claim 1, wherein the AI robot comprises an AI robot lens to assess a depth of the platform above ground to determine targeted descent or ascent of any part of an auger assembly and how far it has traveled for the filling of and subsequent ejection of the hollow shaft drill bit contents.

31. An apparatus for sub-surface injection of a plurality of constituents of a slurry, wet mixture, and or gas in a phase of entrainment for controlled flow, the apparatus comprising:
- a rotary union to facilitate filling of one of the plurality of constituents constituentin one or more hollow shaft drill bits during a drilling process or before the drilling process via an opening and closing of a plurality of valves, wherein the plurality of constituents comprises one or more of a slurry, solution, cold steam or hot steam, suspension, colloid, and a damp substance or a dry substance capable of being injected through the rotary union, wherein the rotary union is in concert with a valve to dispense predefined quantities of constituents at a specific depth in a sequence of dispersal;
- a drilling assembly directed by a global positioning satellite (GPS) to control an X plane, and a Y-plane injection coordinates, wherein the drilling assembly determines through a PLC, a computer, and an AI robot in concert with achieved depths the Z (cubic) volume of injected material;
- a plurality of hollow shaft injection drilling arrays to provide the sequential dispensing of the constituents at one or more targeted depths, wherein the hollow shaft injection drilling arrays enable capturing of targeted volumes of constituents thereby creating mono or poly constituent horizons;
- a plurality of limit switches; and
- a plurality of encoders, wherein the hollow shaft injection drilling arrays are enabled by the plurality of limit switches, the plurality of encoders, and the AI robot to sequence the constituents to be injected at specific depths,
- wherein the hollow shaft injection drilling arrays enable independent ones of the hollow shaft drill bits to individually stop drilling upon encoder detection of slowed revolutions indicating specified resistance.

32. An apparatus for sub-surface injection of a plurality of constituents of a slurry, wet mixture, and or gas in a phase of entrainment for controlled flow, the apparatus comprising:
- a rotary union to facilitate filling of one of the plurality of constituents constituentin one or more hollow shaft drill bits during a drilling process or before the drilling process via an opening and closing of a plurality of valves, wherein the plurality of constituents comprises one or more of a slurry, solution, cold steam or hot steam, suspension, colloid, and a damp substance or a dry substance capable of being injected through the rotary union, wherein the rotary union is in concert with a valve to dispense predefined quantities of constituents at a specific depth in a sequence of dispersal;
- a drilling assembly directed by a global positioning satellite (GPS) to control an X plane, and a Y-plane injection coordinates, wherein the drilling assembly determines through a PLC, a computer, and an AI robot in concert with achieved depths the Z (cubic) volume of injected material;
- a plurality of hollow shaft injection drilling arrays to provide the sequential dispensing of the constituents at one or more targeted depths, wherein the hollow shaft injection drilling arrays enable capturing of targeted volumes of constituents thereby creating mono or poly constituent horizons;
- a plurality of limit switches; and
- a plurality of encoders, wherein the hollow shaft injection drilling arrays are enabled by the plurality of limit switches, the plurality of encoders, and the AI robot to sequence the constituents to be injected at specific depths,
- wherein the hollow shaft injection drilling arrays enable an inference for the AI robot, the PLC, the computer, and database of soil type porosity and tightness that is based on a dynamic interpretation of encoder data of a revolution speed and resistance to the hollow shaft drill bit.

33. An apparatus for sub-surface injection of a plurality of constituents of a slurry, wet mixture, and or gas in a phase of entrainment for controlled flow, the apparatus comprising:
- a rotary union to facilitate filling of one of the plurality of constituents constituentin one or more hollow shaft drill bits during a drilling process or before the drilling process via an opening and closing of a plurality of valves, wherein the plurality of constituents comprises one or more of a slurry, solution, cold steam or hot steam, suspension, colloid, and a damp substance or a dry substance capable of being injected through the rotary union, wherein the rotary union is in concert with a valve to dispense predefined quantities of constituents at a specific depth in a sequence of dispersal:
- a drilling assembly directed by a global positioning satellite (GPS) to control an X plane, and a Y-plane injection coordinates, wherein the drilling assembly determines through a PLC, a computer, and an AI robot in concert with achieved depths the Z (cubic) volume of injected material;
- a plurality of hollow shaft injection drilling arrays to provide the sequential dispensing of the constituents at one or more targeted depths, wherein the hollow shaft injection drilling arrays enable capturing of targeted volumes of constituents thereby creating mono or poly constituent horizons;
- a plurality of limit switches; and
- a plurality of encoders, wherein the hollow shaft injection drilling arrays are enabled by the plurality of limit switches, the plurality of encoders, and the AI robot to sequence the constituents to be injected at specific depths,
- wherein the hollow shaft injection drilling arrays enable strata by strata data from core samples with the GPS coordinates to enable proper RPM range for a motor or PTO driving the hollow shaft drill bit, to protect from damage.

* * * * *